Feb. 16, 1943. A. J. HORNFECK 2,310,955
SYSTEM OF MEASUREMENT AND/OR CONTROL
Filed Dec. 30, 1939 8 Sheets-Sheet 2

Inventor
ANTHONY J. HORNFECK
By Raymond W. Jenkins
Attorney

Inventor
ANTHONY J. HORNFECK
By Raymond D. Junkins
Attorney

Feb. 16, 1943.  A. J. HORNFECK  2,310,955
SYSTEM OF MEASUREMENT AND/OR CONTROL
Filed Dec. 30, 1939  8 Sheets-Sheet 6

Inventor
ANTHONY J. HORNFECK
By Raymond W. Junkins
Attorney

Feb. 16, 1943. A. J. HORNFECK 2,310,955
SYSTEM OF MEASUREMENT AND/OR CONTROL
Filed Dec. 30, 1939 8 Sheets-Sheet 7

Inventor
ANTHONY J. HORNFECK
By Raymond D. Junkins
Attorney

Feb. 16, 1943.  A. J. HORNFECK  2,310,955
SYSTEM OF MEASUREMENT AND/OR CONTROL
Filed Dec. 30, 1939  8 Sheets-Sheet 8

Inventor
ANTHONY J. HORNFECK
By Raymond W. Junkins
Attorney

Patented Feb. 16, 1943

2,310,955

UNITED STATES PATENT OFFICE 2,310,955

SYSTEM OF MEASUREMENT AND/OR CONTROL

Anthony J. Hornfeck, Cleveland, Ohio

Application December 30, 1939, Serial No. 311,728

20 Claims. (Cl. 236—74)

This invention relates to a system for measuring and/or controlling the magnitude of a variable, such as temperature, pressure, rate of fluid flow, position or displacement, although the variable may be of any chemical, physical, electrical, thermal, or other characteristic.

One object of the invention is to provide apparatus wherein the manifestations of a resistance, thermocouple, or other sensitive device may be utilized in the control of amplified power to start, stop or reverse a motor.

Another object of the invention is to provide for the simultaneous indication of the value of a variable condition along with the control of the magnitude of the condition.

A further object of the invention is to provide for control of the speed and duration of rotation of a reversible electric motor wherein no contacts are required.

Still another object is to provide a measuring and/or control system which is continuously and instantaneously responsive to the controlled condition.

A further object is to provide a measuring and/or control system reacting precisely in predetermined manner to minute changes in the magnitude of a variable.

Still another object is to provide apparatus which is simple and rugged in construction, reliable in operation and subject to a minimum of maintenance requirements.

In accordance with my invention a condition responsive device, such as a thermocouple, controls the energization of a control or magnetizing winding of a saturable core reactor to effect corresponding changes in the impedance of the output winding, which in turn determines the electric energy made available to an energy utilizing device, such as a motor, resistor, or the like.

Further, in accordance with my invention the saturation of the saturable core reactor is regeneratively amplified in accordance with the impedance of the output winding to produce a more sensitive control of the energy utilizing device.

Further, in accordance with one form of my invention the primary magnetization of a reactor produced by the control winding is increased or decreased in dependence upon the sense of the current in the control winding, to thereby increase the current in the output winding when the current in the control winding is in one sense and to diminish or maintain essentially constant the current in the output winding when the current in the control winding is in opposite sense.

Further, in accordance with one form of my invention the current in the output windings of a pair of saturable core reactors is differently controlled by opposing the magnetization of each reactor in accordance with the current in the output winding of the other reactor.

For a more complete understanding of my invention reference should be made to the description to follow and to the drawings in which.

Figure 1:
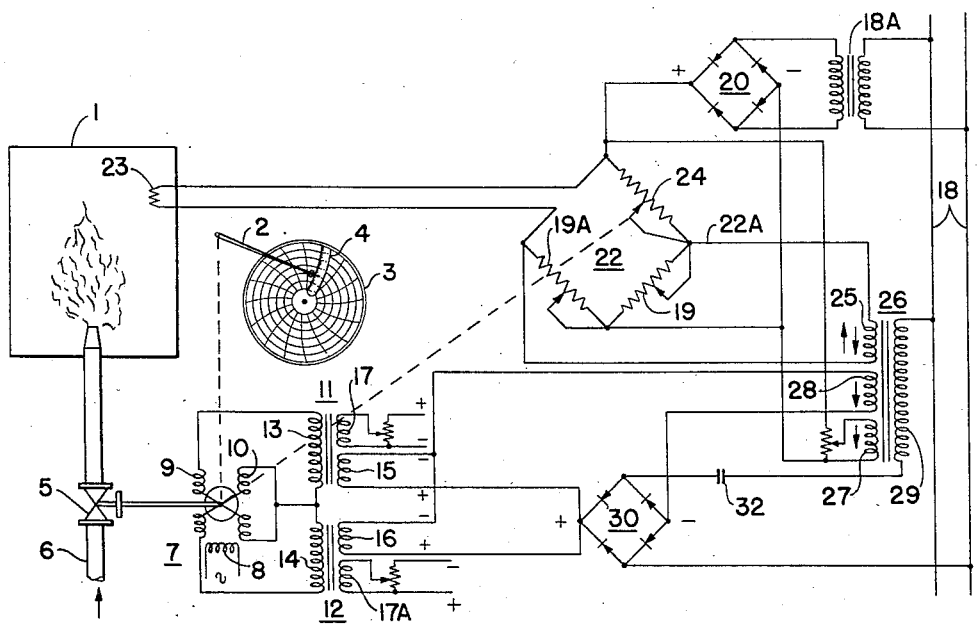
Fig. 1 illustrates diagrammatically one embodiment of my invention.

Referring to Fig. 1, I have therein illustrated my invention arranged to exhibit and to control the temperature within a furnace 1. The exhibiting means is shown as including a movable index 2 which records the temperature on a suitably graduated time revoluble chart 3, and further indicates the temperature by means of a scale 4. The temperature within the furnace is controlled to a desired normal or standard by positioning a valve 5 in a fuel line 6.

The index 2 and fuel valve 5 are simultaneously positioned by a motor 7 having an alternating current field winding 8 and opposed shading pole windings 9 and 10. When the impedance of the circuit including the winding 9 is less than the impedance of the circuit including the winding 10, the motor rotates in one predetermined direction. Conversely, when the impedance of the circuit including the winding 10 is less than that of the circuit including the winding 9, the motor rotates in opposite direction. If both windings are equally energized, or entirely deenergized, the motor remains stationary. The speed of rotation of the motor is determined by the difference in impedance of the circuits of the pole windings 9 and 10. I have shown the driving connection between the motor 7, index 2 and fuel valve 5 schematically, it being evident that such reducing gears and other mechanical devices as may be found necessary may be employed.

The impedances of the motor pole winding circuits are varied by means of saturable core reactors 11 and 12 having alternating current output windings 13, 14 and direct current control windings 15, 16 respectively. The reactors 11 and 12 are further provided with adjustable bias windings 17 and 17A respectively supplied with direct current from any suitable source. The control windings 15 and 16 as shown are connected in parallel. It will be evident that they may be connected in series or other suitable circuit arrangement. The m. m. f. developed by the control winding 15 acts, as shown, in opposition to that produced by the bias winding 17, whereas that developed by the control winding 16 acts in the same direction as that produced by the bias winding 17A.

The constant m. m. f. produced by the bias winding 17 is by proper adjustment made greater than that produced by the control winding 15 when the m. m. f. produced by the latter winding is at the maximum value. The m. m. f. produced by the bias winding 17A may be either greater or less than that produced by the control winding 16. Increases in potential across the windings 15 and 16 will therefore result in an increase in the reactance of the reactor 11 and a decrease in that of the reactor 12. Conversely decreases in potential will cause a decrease in the reactance of the reactor 11 and an increase in that of the reactor 12.

It is evident that by proper selection of the ampere turns of control windings 15 and 16 and the potentials impressed across the bias windings 17 and 17A that when some predetermined potential is impressed across control windings 15, 16 the reactance of the reactors 11 and 12 may be made equal. Under this condition the impedance of the circuits of the pole windings 9 and 10 will be equal and the motor 7 will be stationary. If now the potential impressed across the control windings 15 and 16 is increased, the reactance of the reactor 11 will increase, whereas that of the reactor 12 will decrease. The impedance of the circuit including the pole winding 9 will thus increase, whereas the impedance of the circuit including the winding 10 will decrease. This unequal energization of the windings 9 and 10 will result in rotation of the motor 7 in given direction and at a speed corresponding to the difference in reactance of the reactors 11 and 12. If the potential impressed across control windings 15 and 16 is decreased from the predetermined value the reactance of the reactor 11 will decrease, whereas that of the reactor 12 will increase, thus producing rotation of the motor 7 in opposite direction and at a speed proportional to the difference in reactance of the reactors 11 and 12. Rotation of the motor 7 will continue until the potential impressed upon the control windings 15, 16 is restored to the predetermined value when the reactance of reactors 11 and 12 are equal.

The potential impressed upon the windings 15, 16 is varied in accordance with the temperature within the furnace 1. When the temperature within the furnace 1 is at the normal value the system may be so adjusted that the potential impressed upon control windings 15, 16 is at the predetermined value so that the reactances of the reactors 11 and 12 are equal, and the motor 7 remains stationary. If the temperature within the furnace 1 increases, then the potential impressed upon the control windings 15, 16 will vary proportionately in a direction to effect rotation of the motor 7 to position valve 5 in a closing direction, and simultaneously position the index 2 upwardly relative to the chart 3. Conversely if the temperature in the furnace 1 falls below the normal value the potential impressed upon the control windings 15, 16 will be varied in opposite direction to effect rotation of the motor 7 in a direction to position the fuel valve 5 in an opening direction, and simultaneously position the index 2 downwardly on the chart. In effecting such control of the potential impressed upon the control windings 15, 16 I may employ a self-balancing system so that the position of the valve 5 will at all times be proportional to the temperature within the furnace 1, and likewise the position of the index 2 will correspond to the temperature within the furnace 1.

To control the potential impressed upon the control windings 15, 16 I employ a Wheatstone bridge 22. In one arm of the bridge is a resistance 23 located within the furnace 1 and varying as the temperature thereof. In another arm of the bridge 22 is a resistance 24 which is varied by the motor 7 to maintain the bridge in balance. In the remaining arms of the bridge are adjustable resistances 19 and 19A. In one conjugate conductor is a source of direct current comprising a bridge rectifier 20, which is supplied with A. C. from a suitable source 18 through a transformer 18A. In the other conjugate conductor 22A is a control winding 25 of a reactor 26.

The direction and magnitude of the current in the conjugate conductor 22A is determined by the sense and amount of unbalance of the bridge 22. With the bridge in balance no current passes through the conjugate conductor 22A. By means now to be described the direction of the current flow in the conjugate conductor 22A determines the sense of rotation; and the magnitude of the current determines the speed of rotation of the motor 7.

The reactor 26 is provided with an adjustable bias winding 27, a regenerative winding 28, and an alternating current output winding 29 connected to the source 18. When the current in the control winding 25 is in one direction it aids the magnetization of the reactor 26 produced by the bias winding 27 and regenerative winding 28; and hence decreases the reactance of the reactor and the impedance of the output winding 29. When the current in the control winding 25 is in opposite direction it opposes the magnetization of the reactor produced by the bias winding 27 and regenerative winding 28; and hence increases the impedance of the output winding.

The control windings 15, 16 and regenerative winding 28 are connected in circuit with the output winding 29 through a bridge rectifier 30. As the D. C. potential produced by a rectifier of this type is proportional to the A. C. potential impressed thereon, the current in the control windings 15, 16 and regenerative winding 28 will be inversely proportional to the impedance of the output winding 29, which in turn is determined by the sense and amount of unbalance of the bridge 22.

With the bridge 22 in balance the bias winding 27 is adjusted so that the m. m. f. produced thereby, together with that produced by the regenerative winding 28 establishes an impedance of the output winding 29 producing the predetermined potential in the control windings 15, 16 necessary to equally energize the windings 9 and 10. Under this condition the motor 7 remains stationary. Upon an unbalance of the bridge 22 due to a change in temperature within the furnace 1 a current proportional to the amount of unbalance will flow in the conjugate conductor 22A and the direction of the current will depend upon the sense of unbalance, that is if the temperature decreases the current flow will be in one direction and if the temperature increases the current flow will be in opposite direction.

If the direction of the current in the conjugate conductor 22A is such that the m. m. f. produced by the control winding 25 is in the same direction as that produced by the bias winding 27, the impedance of the output winding 29 will be decreased, thereby increasing the energization of the control windings 15 and 16. This will result in a decrease in energization of the winding 9 and an increase in the energization of the winding 10, thereby producing rotation of the motor 7 in predetermined sense. If the m. m. f. produced by the control winding 25 opposes that produced by the bias winding, the impedance of the output winding 29 will be increased, resulting in rotation of the motor 7 in opposite direction. It is thus apparent that the direction of the current in the conjugate conductor 22A determines the direction of rotation of the motor 7 and the amount of that current determines the speed of rotation.

Rotation of the motor 7 serves to position the fuel valve 5 and index 2. In the embodiment of my invention I have disclosed in Fig. 1, I employ a follow-up or self-balancing system whereby rotation of the motor 7 serves to rebalance the bridge. It is apparent that if desired this follow-up may be eliminated, so that as long as the temperature is other than that desired the motor 7 will continue to operate. Such systems are commonly spoken of as floating control systems in distinction to those employing a follow-up, which are commonly known as positioning control systems.

The regenerative winding 28 increases the sensitivity with which the motor 7 is positioned. Upon a very slight change in temperature within the furnace 1 the resulting unbalance of the bridge 22 would produce but a very slight current in the winding 25, which might not sufficiently vary the impedance of the winding 29 to produce rotation of the motor 7. However, by providing the regenerative winding 28 the initial change in impedance of the output winding 29 produces a further change in its impedance in the same direction as the original change. Thus by means of the regenerative winding 28 I am able to produce a material change in the potential impressed across the control windings 15, 16 for an unbalance of the bridge 22 of minute amount.

I may further increase the sensitivity with which the motor 7 is positioned by connecting in circuit with the output winding 29 a condenser 32 having a reactance somewhat less than that of the output winding when the reactor is saturated. A greater change in the direct current impressed upon the control windings 15 and 16 and regenerative winding 28 will then result for a given change in the impedance of the winding 29.

It will be observed that the speed of the motor 7 decreases as balance of the Wheatstone bridge 22 is restored. By such operation overtravel and hunting is avoided and the index 2 is accurately positioned in accordance with changes in temperature within the furnace 1.

Figure 2:
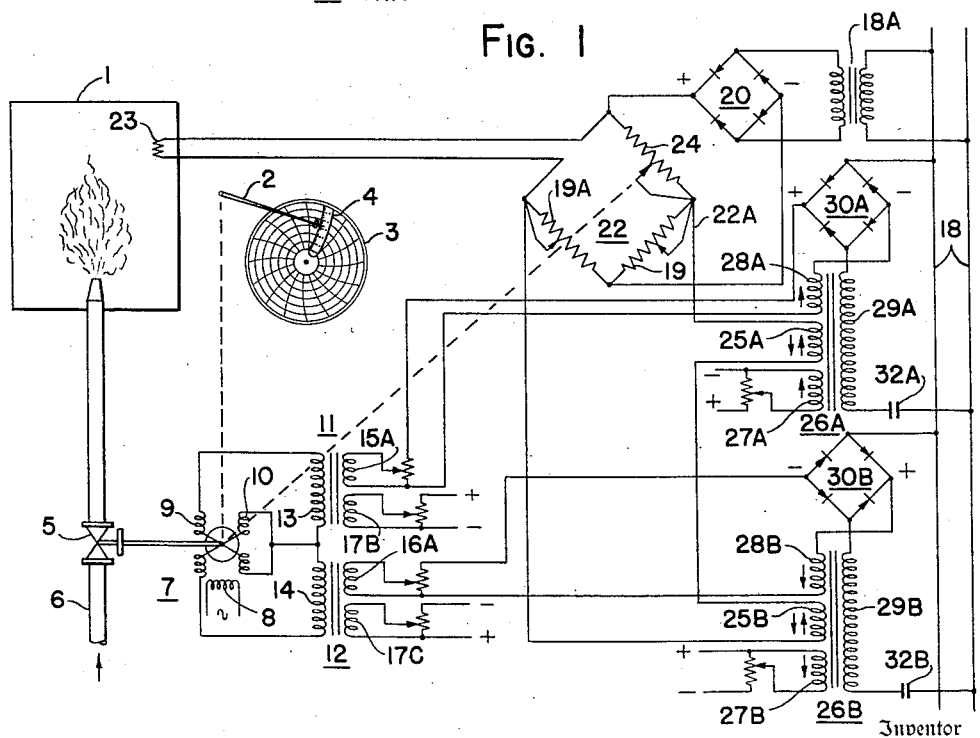
Fig. 2 illustrates a modified form of my invention as illustrated in Fig. 1.

In Fig. 2 I have shown a modified form of my invention as disclosed in Fig. 1. Therein I show two saturable core reactors 26A and 26B arranged to be differentially controlled by the Wheatstone bridge 22 so that upon a current in one direction in the conjugate conductor 22A the impedance of the output winding 29A increases, and that of the output winding 29B decreases. A current of opposite direction in the conjugate conductor 22A decreases the impedance of the output winding 29A and increases that of the output winding 29B. The impedance of the output winding 29A controls the current in the pole winding 9, whereas the impedance of the output winding 29B controls the current in the pole winding 10, so that upon an unbalance of the Wheatstone bridge 22 the motor 7 operates to vary the resistance 24 to restore the bridge to balance and simultaneously position the fuel valve 5 and index 2.

In the embodiment shown in Fig. 2 the control winding 15A of the reactor 11 is connected through a bridge rectifier 30A to the output winding 29A; and the control winding 16A of the reactor 12 is connected through a bridge rectifier 30B to the output winding 29B. The current in both bias windings 17B and 17C may be such that the m. m. f. produced thereby acts in the same direction as that produced by the windings 15A and 16A. Initially these bias windings may be adjusted so that when the Wheatstone bridge 22 is in balance the windings 9 and 10 are equally energized.

The m. m. f. generated by the direct current windings 27A and 28A of the reactor 26A may be considered as being opposite in sense to that produced by the windings 27B and 28B of the reactor 26B. As the control windings 25A and 25B are connected in series, when the current in the conjugate conductor 22A is in one direction the m. m. f. produced by the control winding 25A will aid that produced by the windings 27A and 28A; and the m. m. f. produced by the control winding 25B will act in opposition to that produced by the windings 27B and 28B. With a current of opposite direction in the conjugate conductor 22A the m. m. f. produced by the control winding 25A will act in opposition to that produced by the windings 27A and 28A; and the m. m. f. produced by the control winding 25B will aid that produced by the windings 27B and 28B. In the first case the impedance of the output winding 29A will be decreased, thereby increasing the current in the control winding 15A and increasing the energization of the pole winding 9. Simultaneously the energization of the pole winding 10 will be decreased by virtue of the increase in impedance of the output winding 29B. This will effect rotation of the motor 7 in direction to vary the resistance 24 to restore the bridge to balance. In the latter case the impedance of the output winding 29B will decrease, thereby effecting rotation of the motor 7 in opposite direction.

As explained with reference to Fig. 1, the regenerative windings 28A and 28B serve to increase the sensitivity so that minute changes in the resistance 23 will effect proportionate changes in the position of the motor 7. I may also provide condensers 32A and 32B to further increase the sensitivity of the apparatus.

Figure 3:
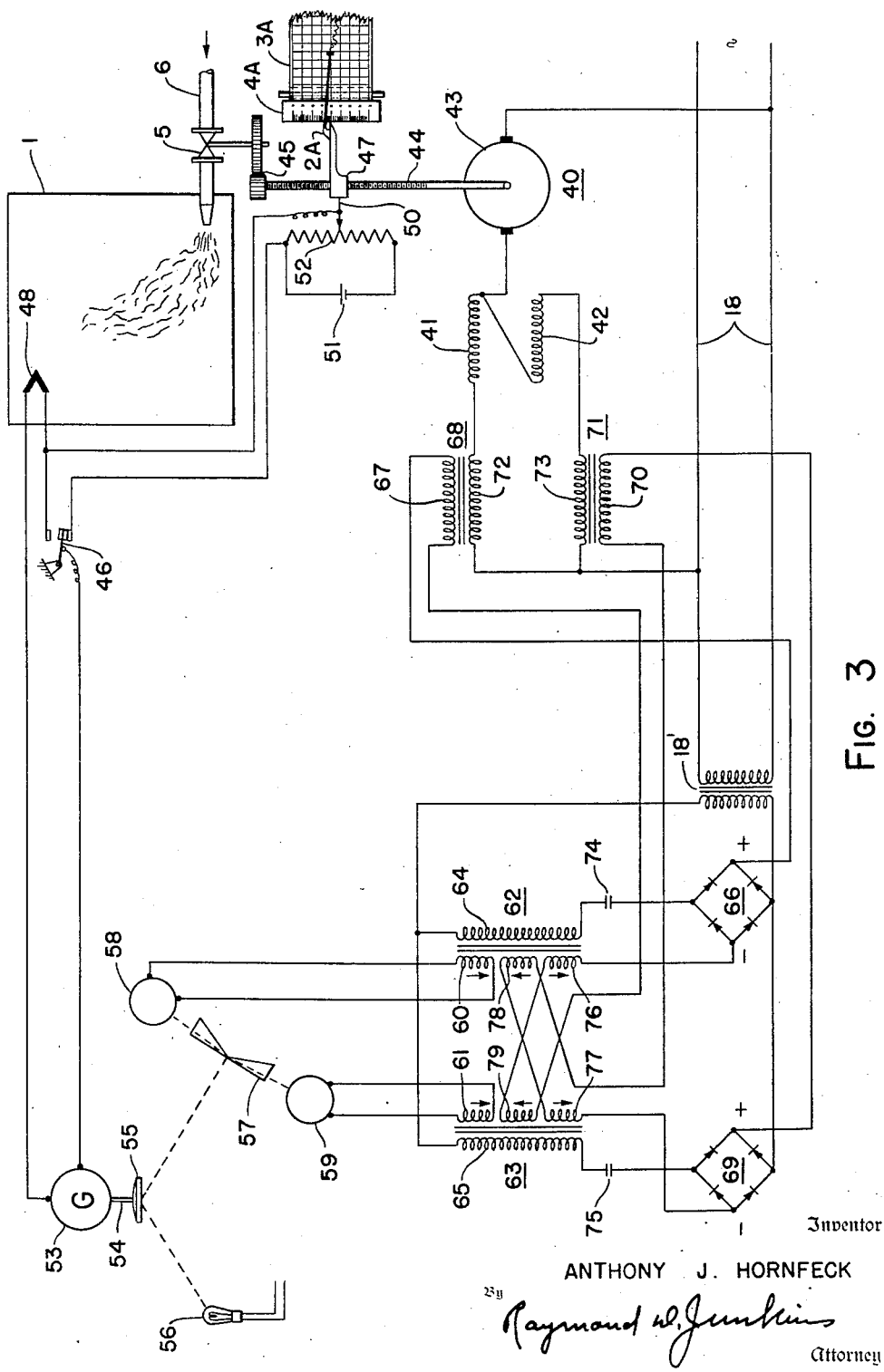
Fig. 3 illustrates diagrammatically a further embodiment of my invention.

In Fig. 3 I show a further embodiment of my invention wherein the fuel valve 5 and exhibiting mechanism is actuated by a series wound alternating current motor 40. The motor 40 is provided with field windings 41 and 42 and an armature 43. Energization of the winding 41 together with the armature 43 from the source 18 effects rotation of the motor in one direction, whereas energization of the winding 42 and armature 43 effects rotation in the opposite direction. Normally when the motor 40 is stationary the windings 41 and 42 are equally energized a relatively small amount.

The motor 40 is provided with a threaded output shaft 44 which through gears 45 positions the fuel valve 5. Threaded to the shaft 44 is a nut 47 carrying an index 2A, which in cooperation with a graduated scale 4A indicates the temperature within the furnace 1 and in cooperation with a chart 3A, which is positioned in accordance with time, records the temperature within the furnace 1.

In the embodiment shown in Fig. 3 I may employ the null or balance system wherein I balance the potential generated by a thermocouple 48 against the fall in potential through that portion of a slide wire resistance 52 determined by the position of a contact 50 which is carried by the nut 47. The slide wire resistance is connected to a suitable source of potential 51 so that a constant potential drop is maintained across it. The potential generated by the thermocouple 48 acts in opposition to the fall in potential through that portion of the slide wire resistance 52 determined by the position of the contact 50. If these are not equal, then the contact is positioned along the slide wire 52 until such equality is restored. Thus upon the potential generated by the thermocouple 48 decreasing, indicating a decrease in temperature within the furnace 1, the motor 40 is rotated in proper direction to position the contact 50 upwardly along the slide wire 52 until equilibrium between the thermocouple potential and the fall in potential through that portion of the slide wire resistance 52 determined by the position of the contact 50 is again made equal. To determine an inequality between the potentials, I employ, in Fig. 3, a galvanometer 53, which through means now to be described controls the operation of the motor 40.

The galvanometer 53 has a movable member 54 which is deflected from a mid or neutral position in correspondence with the difference between the potential generated by the thermocouple 48 and the fall in potential through that portion of the slide wire 52 determined by the position of the contact 50. The member 54 carries a mirror 55 which reflects light from a suitable source 56 to a dividing prism 57. Adapted to receive light from the prism 57 are oppositely disposed photo-voltaic cells 58 and 59.

When, as shown, the member 54 is in the mid or neutral position, the mirror 55 is so positioned that the light transmitted to the photo-voltaic cell 58 is equal to that transmitted to the photo-voltaic cell 59, so that the photo-voltaic cells produce equal potentials. Upon an unbalance or displacement of the member 54 in one direction, caused for example by the potential generated by the thermocouple 48 increasing, more light will be transmitted to the photo-voltaic cell 59 and less light to the photo-voltaic cell 58, thereby increasing the potential generated by the former and decreasing that generated by the latter. By proper design of the dividing prism 57 and nature of the light beam reflected by the mirror 55 the difference between the light transmitted to the photo-voltaic cells may be made proportional to the displacement of the member 54 from the mid or neutral position, thereby causing proportionate differences in the potential generated by these photo-voltaic cells.

The photo-voltaic cells 58, 59 serve to energize control windings 60 and 61 of saturable core reactors 62 and 63 respectively, having output windings 64 and 65 energized by the A. C. source 18 through a transformer 18'. When the light transmitted to the photoelectric cell 59 increases and simultaneously therewith that transmitted to the photo-voltaic cell 58 decreases, the impedance of the output winding 65 will decrease, whereas that of the output winding 64 will increase.

The output winding 64 is connected in circuit through a bridge rectifier 66 to the control windnig 67 of a saturable core reactor 68. Similarly the output winding 65 is connected in circuit through a bridge rectifier 69 to the control winding 70 of a saturable core reactor 71. The output winding 72 of the reactor 68 is connected in circuit with the winding 41, whereas the output winding 73 of the reactor 71 is connected in circuit with the motor winding 42. Thus it will be seen that upon a decrease in impedance of the output winding 65, causing a corresponding increase in the current in the control winding 70, the impedance of the output winding 73 will be decreased, effecting a greater current flow through motor winding 42 than through winding 41, thereby effecting rotation of the motor 40 in given direction. Conversely if the impedance of the output winding 64 decreases below that of the winding 65, then the current in the control winding 67 will increase proportionately, decreasing the impedance of the output winding 72, increasing the current in the motor winding 41 above that in the winding 42 and effecting rotation of the motor 40 in opposite direction.

In the operation of the apparatus so far described, upon an increase, for example, in temperature within the furnace 1 the potential generated by the thermocouple 48 will increase, thereby positioning the galvanometer 54 to the left as viewed in the drawing, increasing the light falling on the photo-voltaic cell 59 and decreasing the light falling on the photo-voltaic cell 58. Under this condition the impedance of the output winding 65 will decrease below that of the output winding 64 which through reactors 68 and 71 will effect rotation of the motor 40 in a direction to increase the fall in potential through that portion of the slide wire resistance 52 determined by the position of the contact 50. When the motor 40 has positioned the contact 50 sufficiently so that the fall in potential through the slide wire and the potential generated by the thermocouple 48 are again equal, the galvanometer member 54 will be restored to the mid or neutral position when equal light is transmitted to photo-voltaic cells 58 and 59.

I may, as explained with reference to Figs. 1 and 2, increase the sensitivity, that is increase the change in current produced in the motor windings 41 and 42 for a given change in the impedance of the output windings 64 and 65 by connecting in circuit with the latter condensers such as diagrammatically illustrated at 74 and 75.

I materially increase the sensitivity with which the motor 40 is controlled by providing each of the reactors 62, 63 with a regenerative winding 76, 77 which amplifies the ultimate change in impedance of the output windings 64, 65 caused by an initial change in the energization of the control windings 60, 61; and by providing the reactors with degenerative windings 78, 79 which act to produce a change in the impedance of the output winding of the other reactor proportional to the change in its associated output winding but in opposite sense.

The regenerative winding 76 and degenerative winding 79 are connected in series with the control winding 67 and in circuit with the output winding 64 through the bridge rectifier 66. Thus their energization is controlled and varied in accordance with the impedance of the output winding 64. The regenerative winding 76 is arranged so that the m. m. f. produced thereby acts in the same direction as that produced by the control winding 60, and hence acts to regeneratively amplify the change in impedance of the output winding 64 caused by an initial change in energization of the control winding 60. Similarly the regenerative winding 77 and degenerative winding 78 are connected in series with the control winding 70 and in circuit with the output winding 65 through the bridge rectifier 69 so that their energization is controlled and varies in accordance with the impedance of the output winding 65. The regenerative winding 77 is arranged so that the m. m. f. produced thereby acts in the same direction as that produced by the control winding 61, and hence acts to regeneratively amplify a change in impedance of the output winding 65 caused by an initial change in energization of the control winding 61.

The degenerative windings 78, 79 are arranged so that the m. m. f. produced oppose those produced by the control windings 60, 61 respectively. Thus it will be seen that an increase in energization of the windings 76, 79 acts to decrease the impedance of the output winding 64 and to increase that of the output winding 65. Conversely, an increase in energization of windings 77, 78 acts to decrease the impedance of the output winding 65 and to increase that of the output winding 64.

Assuming the system to be in balance, that is with equal light falling on the photo-voltaic cells 58, 59 so that the impedances of the output windings 64, 65 are equal, resulting in equal energization of the motor windings 41, 42, an increase in light falling upon photo-voltaic cell 58 and a corresponding decrease of light falling on photo-voltaic cell 59 will initially result in a decrease in the impedance of the output winding 64 which will effect a further regenerative decrease therein due to the increase in energization of the regenerative decrease therein due to the increase in energization of the regenerative winding 76.

Simultaneously with the operation described the impedance of the output winding 65 would be initially increased by the decrease in energization of the control winding 61. This initial increase in impedance of the output winding 65 would be followed by a further increase caused by the decrease in energization of the regenerative winding 77 and an increase in energization of the degenerative winding 79. As the energization of the regenerative winding 77 decreased, that of the degenerative winding 78 would likewise decrease, which would effect a further decrease in impedance of the output winding 64. Thus a minute change in energization of the control winding 60, 61 will result in a material change in energization of the output windings 64, 65. The ultimate change in impedance of the output windings 64, 65 will be sufficient to effect operation of the motor 40 so that the contact 50 and index 2A will be accurately positioned in accordance with changes in temperature within the furnace 1.

The opposite action occurs upon an increase in light falling on the photo cell 59 and a corresponding decrease of light falling on photo-voltaic cell 58. In this instance the initial decrease in impedance of the output winding 65 will be followed by a further decrease caused by the increase in energization of the regenerative winding 77 and decrease in energization of the degenerative winding 79. The decrease in impedance of the output winding 65 will effect, through degenerative winding 78, a corresponding increase in impedance of the output winding 64 which will amplify the increase caused by the decrease in energization of the control winding 60 and regenerative winding 76.

The arrangement so far described is of the positioning type, where for each temperature within the furnace 1 there is a definite position of the index 2A and valve 5. I may readily convert the control to a floating system by disconnecting the thermocouple 48 from the slide wire 52 as by turning the switch 46 to connect the thermocouple directly to the galvanometer 53. When so connected whenever the temperature within the furnace 1 departs from that desired the motor 40 will continue to position the valve 5 and index 2A until the desired temperature is restored. As will be readily understood by those familiar with the art the galvanometer 53 may be provided with suitable electrical or mechanical adjustments so that when the temperature within the furnace 1 is at the desired value it will be in the mid or neutral position so that equal light will be reflected on the photo-voltaic cells 58 and 59.

Figure 5:
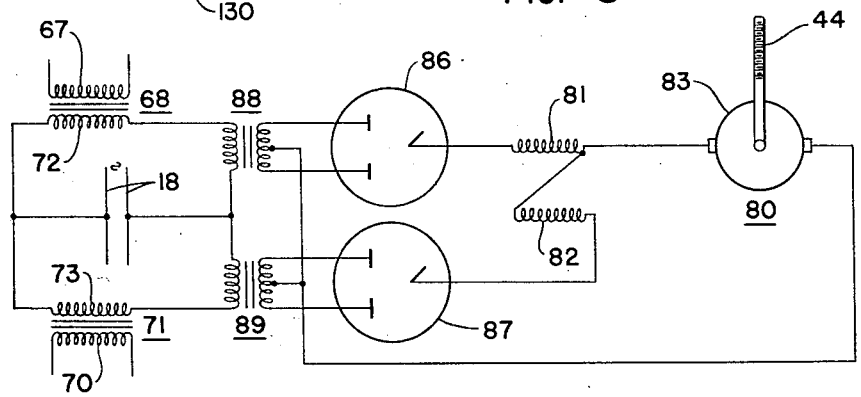
Figs. 4 and 5 illustrate diagrammatically modifications of a part of the circuit shown in Fig. 3.
Figure 4:
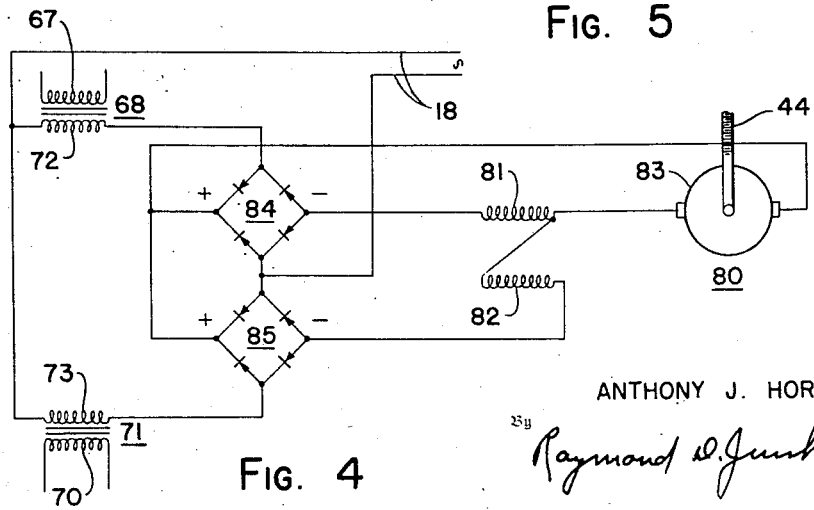

In Fig. 3 I have illustrated my invention arranged to control a series wound alternating current motor 40. In Figs. 4 and 5 I illustrate how this circuit may be employed to control a series wound direct current motor 80 having opposed stator windings 81, 82 and an armature 83. The armature 83 is arranged to rotate the shaft 44 and except for the modification now to be described the arrangement and operation is identical with that described with reference to Fig. 3. In the modification disclosed in Figs. 4 and 5 the alternating current in the output windings 72, 73 of the saturable core reactors 68, 71 is rectified to direct current and one or the other of the windings 81, 82 selectively energized in accordance with the desired direction of rotation of the shaft 44.

In Fig. 4 the output winding 72 is connected in circuit with the motor winding 81 through a bridge rectifier 84, so that the direct current in the winding 81 will be inversely proportional to the impedance of the output winding 72. Similarly the output winding 73 is connected in circuit with the winding 82 through a bridge rectifier 85 so that the current therein will vary in inverse proportion to the impedance of the output winding 73. Upon an increase in energization of the control winding 67 the direct current in the motor winding 81 will proportionately increase due to the decrease in impedance of the output winding 72, effecting rotation of the motor 80 in one sense. Conversely an increase in energization of the control winding 71 will effect an increase in energization of the motor winding 82 effecting rotation of the motor 80 in opposite direction.

In the arrangement shown in Fig. 5 the alternating current in the output windings 72, 73 is rectified to direct current through full wave thermionic rectifiers 86, 87. As shown, the rectifier 86 is connected in circuit with the winding 72 through a suitable transformer 88, and the rectifier 87 is connected in circuit with the winding 73 through a transformer 89. The operation is similar to that described with reference to Fig. 4. Upon an increase in current in the control winding 67, for example, the impedance of the output winding 72 decreases, effecting an increase in alternating current which by means of transformer 88 and rectifier 86 effects a proportionate increase in direct current in the winding 81, thus producing rotation of the motor 80 in one direction. An increase in energization of the control winding 70 effects rotation of the motor 80 in opposite direction by decreasing the impedanc of the output winding 73, causing an increase in alternating current therein and through the transformer 89 and rectifier 87 effecting a proportionate increase in current in the winding 82. Energization of the control windings 67, 70 is effected by means of saturable core reactors 62, 63 and associated apparatus as described with reference to Fig. 3.

Figure 6:
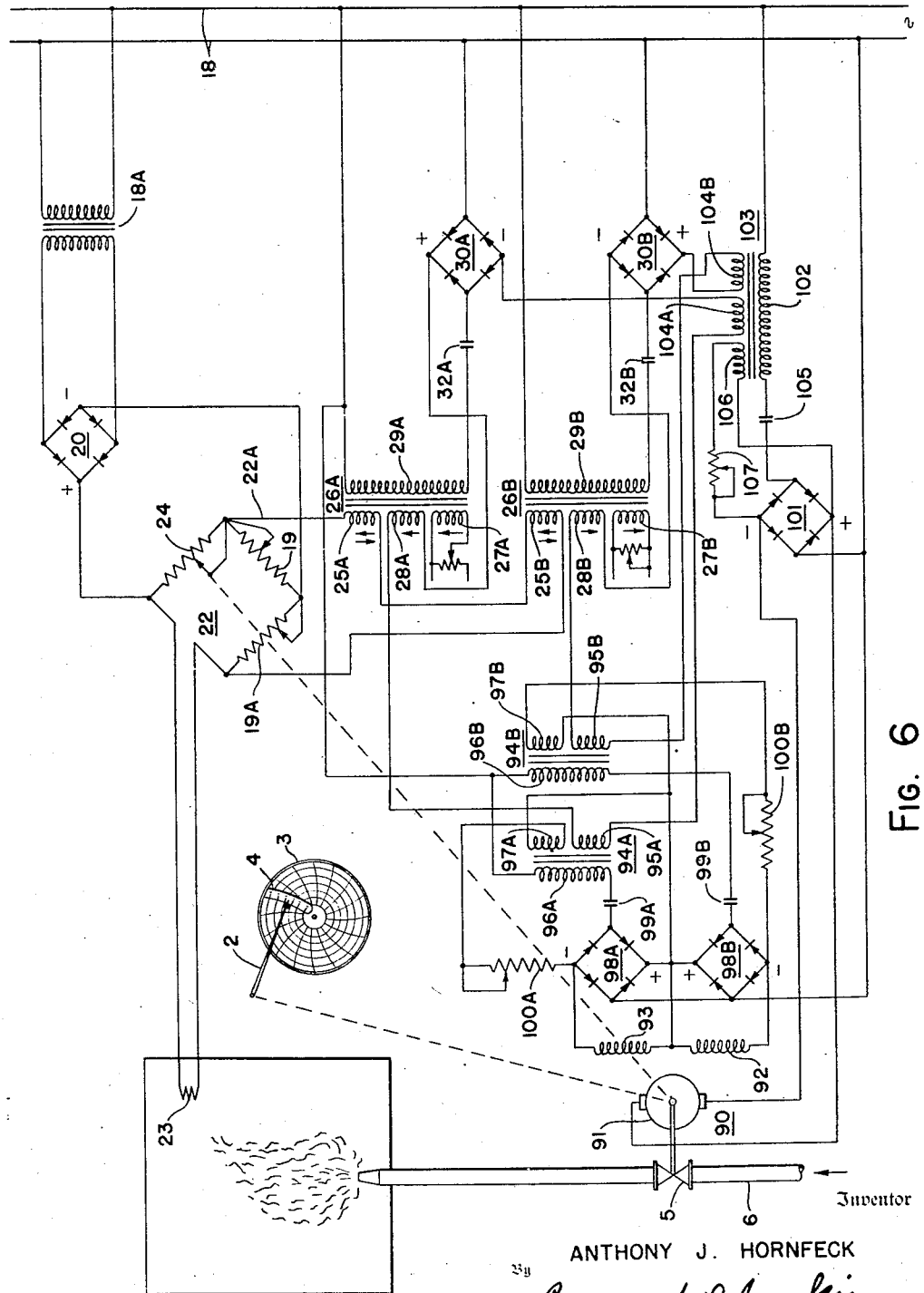

In Fig. 6 I disclose an embodiment of my invention wherein the fuel valve 5 and index 2 are positioned by a shunt wound direct current motor 90. The control circuit for the motor 90 is similar to that described with reference to Fig. 2, suitably modified to adapt it to a shunt wound direct current motor.

The motor 90 is provided with a wound armature 91 and opposed shunt winding 92, 93. I cause the motor to rotate in desired sense by selectively energizing one or the other of the shunt windings 92, 93, and further cause it to rotate at desired speed by varying the energization of the armature winding. Under balanced conditions, that is with the bridge 22 in balance, so that there is no current in the conjugate conductor 22A, shunt windings 92, 93 and winding of armature 91 are substantially deenergized so that the motor 90 is stationary. When the bridge 22 becomes unbalanced, one or the other of the shunt windings 92, 93 is energized selectively in accordance with the direction of rotation of motor 90 necessary to restore the bridge to balance. Simultaneously therewith the winding of the armature 91 is energized in amount corresponding with the amount of unbalance of the bridge so that as the bridge approaches balanced condition the speed of the motor diminishes, thus avoiding undesirable overshooting and hunting.

As explained with reference to Fig. 2, included in the conjugate conductor 22A of the bridge 22 are control windings 25A and 25B of saturable core reactors 26A and 26B respectively. When the current in the conjugate conductor 22A is in one direction the m. m. f. produced by the control winding 25A is in the same direction as that produced by the regenerative winding 28A and the m. m. f. produced by the control winding 25B is in the opposite direction to that produced by the regenerative winding 28B. Under this condition the impedance of the output winding 29A is materially decreased, whereas that of the output winding 29B by proper adjustment of the windings remains substantially constant. As will shortly be described, the decrease in impedance of the output winding 29A is effective for energizing the shunt winding 93 of the motor 90 to effect rotation thereof in a sense to restore the bridge 22 to balance and to further energize the armature winding by an amount corresponding to the amount of decrease in the impedance of the output winding 29A so that the motor rotates at a speed corresponding to the amount of unbalance of the bridge 22.

When the current in the conjugate conductor 22A is in opposite direction the m. m. f. produced by the control winding 25A is in opposite direction to that produced by the regenerative winding 28A and the m. m. f. produced by the control winding 25B is in the same direction as that produced by the regenerative winding 28B. Under this condition the impedance of the output winding 29B is materially decreased, whereas that of the output winding 29A remains substantially constant. Such reduction in impedance of the winding 29B effects energization of the shunt winding 92, causing rotation of motor 90 in opposite direction, and simultaneously energizes the winding of the armature 91 in amount corresponding to the decrease in impedance of the winding 29B so that the motor rotates at a speed corresponding to the amount of unbalance of the bridge 22.

Changes in the impedance of the output windings 29A and 29B are further amplified by providing a second stage of amplification comprising saturable core reactors 94A and 94B. As shown, the winding 29A is connected in circuit through the bridge rectifier 30A with regenerative winding 28A and control winding 95A of reactor 94A. Similarly the winding 29B is connected in circuit through the bridge rectifier 30B with the regenerative winding 28B and control winding 95B of the reactor 94B. The impedance of the output windings 96A and 96B of reactors 94A and 94B is accordingly controlled by output windings 29A and 29B respectively.

Changes in impedance of output windings 96A and 96B are further regeneratively amplified by regenerative windings 97A and 97B connected in circuit with the output windings 96A and 96B respectively through bridge rectifiers 98A and 98B. Further sensitivity may be obtained as heretofore described by connecting condensers 99A and 99B in circuit with the output windings 96A and 96B. Adjustable resistances 100A and 100B provide a means for adjusting the relative energization of the regenerative windings 97A and 97B.

The energization of the shunt winding 93 is controlled by the impedance of the output winding 96A to which it is connected through bridge rectifier 98A. Similarly the energization of the shunt winding 92 is controlled in accordance with the impedance of the output winding 96B to which it is connected through bridge rectifier 98B. The shunt winding 93 is effectively energized when the m. m. f. produced by the control winding 25A aids that produced by the regenerative winding 28A. Likewise the shunt winding 92 is effectively energized when the bridge 22 is unbalanced in opposite direction so that the m. m. f. produced by the control winding 25B aids that produced by the regenerative winding 28B. Normally, that is when the bridge 22 is in balance so that no current passes through the conjugate conductor 22A, both shunt windings 92 and 93 are substantially deenergized or slightly energized equal amounts so that the motor 90 remains stationary. The operation of my control circuit so far described provides for selective operation of the motor 90 in one direction or the other depending upon the sense of unbalance of the bridge 22. I will now describe the means whereby I effect operation of the motor 90 at a speed corresponding to the amount of unbalance of the bridge 22.

The winding of the armature 91 is connected in circuit through a bridge rectifier 101 to the output winding 102 of a saturable core reactor 103. The voltage applied to the armature winding, and hence the speed of the motor 90, is accordingly controlled by the impedance of the output winding 102. To control the impedance of the output winding 102 in accordance with the impedance of the output windings 29A and 29B I provide the reactor 103 with control windings 104A and 104B. The control winding 104A is connected with the output winding 29A through bridge rectifier 30A and the control winding 104B is connected in circuit with the output winding 29B through the bridge rectifier 30B. Accordingly, a decrease in impedance of the output winding 29A will effect an increase in current in the control winding 104A, thus decreasing the impedance of output winding 102, causing the motor 90 to rotate at a speed corresponding to the decrease in impedance of the output winding 102. A decrease in impedance of the output winding 29B effects a proportionate increase in current in the control winding 104B, thus causing the motor 90 to rotate at a speed corresponding to the increase in current in the control winding 104B by virtue of the proportionate decrease in impedance of the output winding 102.

Changes in impedance of the output winding 102 caused by a change in current in the control winding 104A or 104B may be further amplified by means of a condenser 105 and a regenerative winding 106. An adjustable resistance 107 connected in circuit with the regenerative winding 106 provides a means for varying the effect of the regenerative winding 106 on the impedance of the output winding 102.

In general, it will be seen that the circuit arrangement disclosed in Fig. 6 provides a means for obtaining directional control of the motor 90 through selective energization of the shunt windings 92 and 93; and speed control through energization of variable magnitude of the armature winding of the armature 91.

Figure 7:
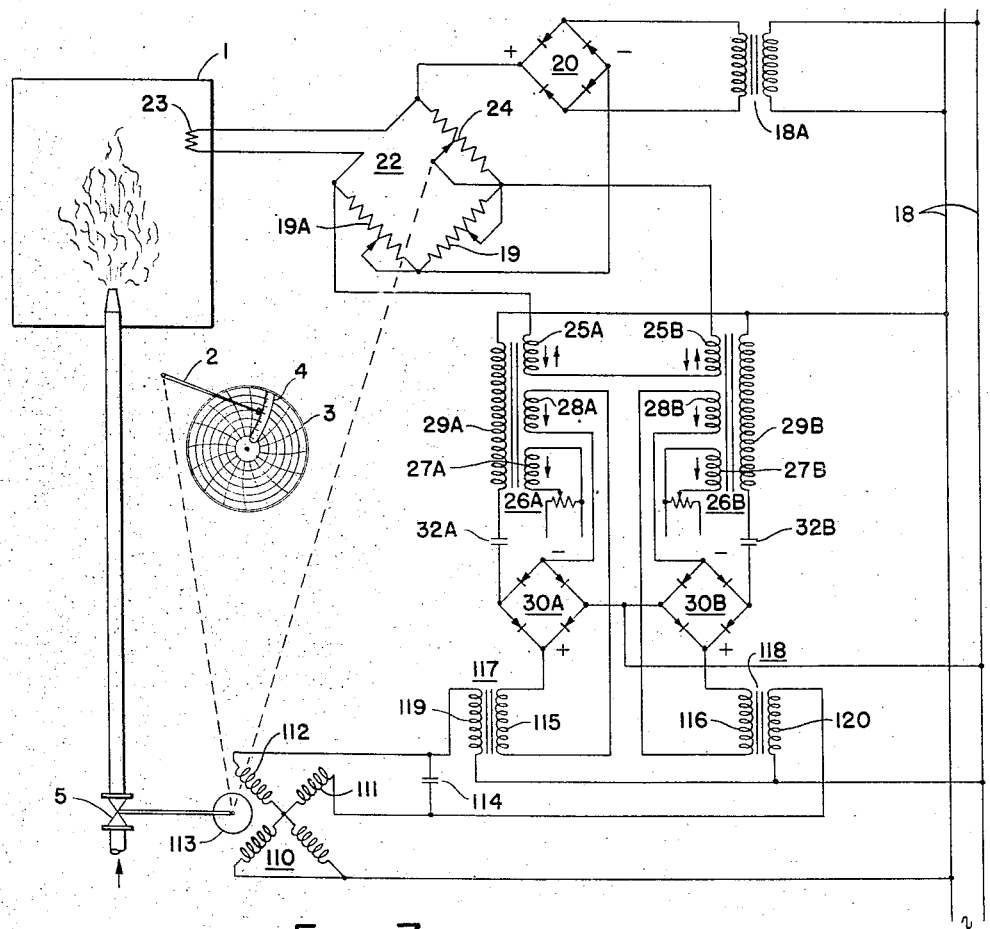

In Fig. 7 I illustrate a control circuit generally the same as that disclosed in Fig. 2 arranged to control a capacitor motor 110 having quadrature stator windings 111, 112 and an armature 113. Connected between the windings 111 and 112 is a condenser 114, which as known serves to produce rotation of the motor in one direction when the winding 111 is energized, and in opposite direction when the winding 112 is energized.

The motor 110 serves to position the fuel valve 5 and index 2 to control and exhibit the temperature within the furnace 1. Likewise the motor varies the resistance 24 to restore bridge 22 to balance after a departure from such condition due to a change in temperature within the furnace 1.

As explained with reference to Fig. 2, the impedance of the output winding 29A is decreased and that of the output winding 29B increased upon unbalance of bridge 22 in one direction, and conversely the impedance of the output winding 29B is decreased and that of the winding 29A increased upon unbalance of bridge 22 in opposite direction. Such simultaneous changes in impedance of the output windings 29A and 29B in opposite directions control the energization of control windings 115 and 116 of saturable core reactors 117 and 118 respectively. The output winding 119 of reactor 117 is connected to the stator winding 112, whereas the output winding 120 of reactor 118 is connected to stator winding 111. Upon an increase in energization of the control winding 115 in effect a connection is made between winding 112 and alternating current source 18, so that the motor rotates in one direction. Upon an increase in the energization of control winding 116 the stator winding 111 is in effect connected to the source 18 so that the motor operates in opposite direction. Accordingly, upon an unbalance of bridge 22 in a given direction the arrangement is such that the proper stator winding is effectively energized so that the motor 110 rotates to vary resistance 24 to rebalance the bridge. Simultaneously therewith the fuel valve 5 is positioned as well as the index 2. Upon unbalance of the bridge 22 in opposite direction the opposite stator winding is energized so that the motor 110 rotates in opposite direction, again restoring the bridge 22 to balance by varying resistance 24 and simultaneously positioning the fuel valve 5 and index 2 in opposite direction.

Figure 8:
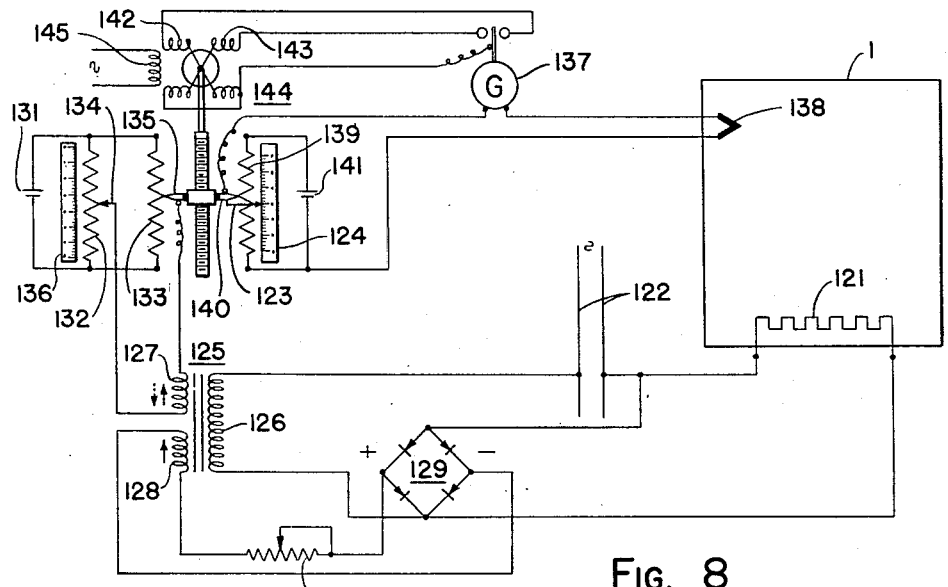
Figs. 6, 7, 8, 9, 10, 11 and 12 illustrate further embodiments of my invention.

In Fig. 8 I disclose a modified form of my invention wherein I control the temperature within the furnace 1 by varying the current in a heating resistor 121 connected to a suitable source of alternating current 122. The form of the invention illustrated is further adapted to indicate the temperature within the furnace 1 by means of a movable index 123 and cooperating scale 124.

The current in the heating resistor 121 is controlled by means of a saturable core reactor 125 having an output winding 126 which is connected in circuit with the resistor. An increase in impedance of the output winding 126 results in a decrease in current in the resistor 121 whereas a decrease in impedance of the output winding 126 results in an increase in current.

The impedance of the output winding 126 is controlled in accordance with the temperature within the furnace 1 by means of a direct current control winding 127 and a regenerative winding 128 connected in circuit with the output winding 126 through a bridge rectifier 129 which is connected in parallel with the heating resistance 121. The direct current in the regenerative winding 128, which will vary inversely with the impedance of the output winding 126, always flows in the direction indicated by the arrow. Such current therefore produces an m. m. f. in the reactor 125 always acting in the same direction.

When the temperature within the furnace 1 is above that desired the current in the control winding 127 is in such direction (as indicated by the dotted arrow) that the m. m. f. produced thereby opposes that produced by the current in the regenerative winding 128. When the temperature within the furnace 1 is below that desired, the current in the control winding 127 is in opposite direction so that the m. m. f. produced thereby is in the same direction as that produced by the regenerative winding 128. In the former case, that is when the temperature within the furnace 1 is above that desired, the net m. m. f. effective in the reactor 125 will be equal to the difference in m. m. f. produced by the current in the control winding 127 and regenerative winding 128. Accordingly, the more the actual temperature within the furnace 1 is above that desired the less will be the effective m. m. f. within the reactor 125, and accordingly the impedance of the output winding 126 will be increased proportionately. Conversely when the actual temperature is below that desired the net m. m. f. in the reactor 125 will be the sum of the m. m. f. severally produced by the current in control windings 127 and 128. Accordingly, the impedance of the output winding 126 will be reduced in proportion to the decrease in actual temperature below that desired. When the temperature within the furnace 1 is at the desired value, then no current passes through the control winding 127 so that the impedance of the output winding 126 will be determined by the m. m. f. produced by the regenerative winding 128. A variable resistance 130 is provided so that the current in the regenerative winding 128 and accordingly the m. m. f. produced thereby may be varied so that the heat generated by the resistor 121 will be sufficient to substantially maintain the furnace 1 at the desired temperature.

The current in the control winding 127 is controlled in direction and amount in accordance with the relation between actual temperature in the furnace 1 and that desired by means including a potentiometer comprising a source of potential 131 and slide wire resistances 132 and 133. One side of the winding 127 is connected to a contact 134 manually adjustable along the slide wire resistance 132. The opposite side of the winding 127 is connected to a contact 135 carried by the index 123 and positioned along the slide wire resistance 133 in accordance with the actual temperature within the furnace 1.

The contact 134 is adjusted along the slide wire resistance 132 in accordance with the temperature which it is desired to maintain in the furnace 1. For convenience in adjusting, a cooperating scale 136 graduated in terms of temperature may be provided. The position of the contact 134 determines the temperature at which there will be no current in the winding 127. When the contact 135 is at the same point along the slide wire resistance 133 as the contact 134 is along the slide wire resistance 132, then both sides of the winding 127 will be at equal potentials so that there will be no current in the winding 127. Assuming that the actual temperature within the furnace 1 rises above that desired, then the contact 135 will be positioned upwardly a proportionate amount, thereby causing a current in the winding 127 producing an m. m. f. in the reactor 125 acting in opposition to that produced by the current in the regenerative winding 128. Conversely when the actual temperature falls below that desired the contact 135 will be positioned downwardly proportionately, resulting in a current in the control winding 127 producing an m. m. f. in the reactor 125 which will aid that produced by the current in the regenerative winding 128.

Contact 135 and index 123 may be positioned by any suitable temperature measuring device. By way of illustration I have shown more or less schematically a temperature measuring system such as disclosed in Patent 2,015,968, dated October 1, 1935, to J. D. Ryder. As illustrated, a galvanometer diagrammatically indicated at 137 is under the joint control of a thermocouple 138 sensitive to the temperature within the furnace 1 and the potential fall in the portion of a slide wire resistance 139 which is determined by the position of a contact 140 carried by the index 123. The slide wire resistance is provided with a source of constant potential, such as that indicated at 141. If the potential produced by the thermocouple 138 is equal to that determined by the position of the contact 140 then the galvanometer 137 is in the neutral position. Upon unbalance of these potentials however the galvanometer is deflected to the right or the left, depending upon whether the potential produced by the thermocouple 138 is greater or less than that determined by the position of the contact 140.

Deflections of the galvanometer 137 to the right or left selectively short circuit the winding 142 or 143 of an opposed wound shading pole motor 144 having an alternating current field winding 145. The particular pole winding short circuited is such as to cause positioning of the contacts 135, 140 and index 123 in a direction such that the balance between the potential produced by the thermocouple 138 and that determined by the position of the contact 140 is restored. Thus the position assumed by contact 135 will at all times be proportional to the temperature within the furnace 1.

It will be evident to those skilled in the art that the particular temperature measuring device I have proposed has been illustrated schematically inasmuch as the details of such devices are well known. For example, I may provide suitable contacting apparatus to be associated with the galvanometer 137 so that periodically the winding 142 or 143 is short circuited for a time duration corresponding to the deflection of the galvanometer from mid or neutral position. Such details however comprise no part of my present invention.

Figure 9:
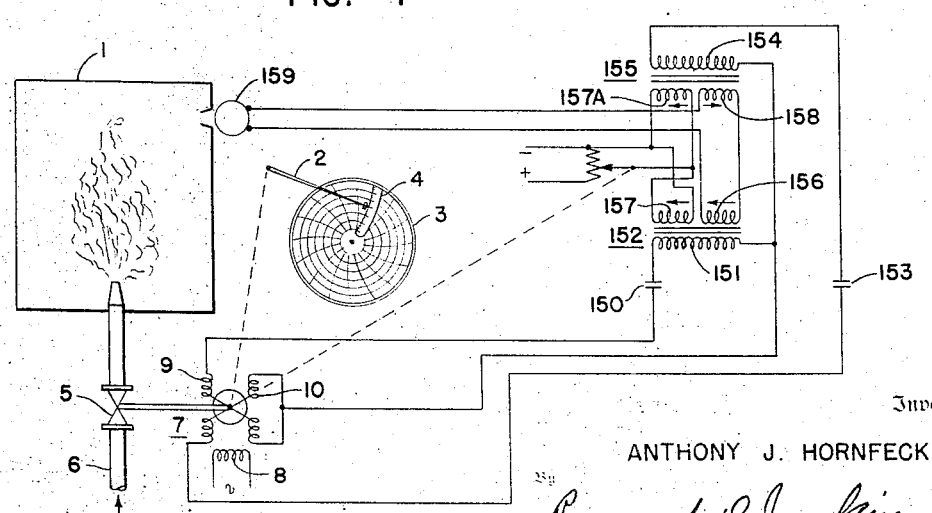

In Fig. 9 I illustrate a further embodiment of my invention wherein the opposed pole windings 9 and 10 of the motor 7 are controlled by differentially regulating the reactance of the circuits in which they are included. Connected in circuit with the pole winding 9 is a condenser 150 and the output winding 151 of a saturable core reactor 152. Connected in circuit with the pole winding 10 is a condenser 153 and the output winding 154 of a saturable core reactor 155. The reactor 152 is provided with a control winding 156 and a separately excited adjustable bias winding 157. The reactor 155 is similarly provided with a control winding 158 and a bias winding 157A connected in parallel with the bias winding 157.

The control windings 156 and 158 are connected in series to a photoelectric device which produces a potential corresponding to the temperature within the furnace 1. By way of example I have shown the photoelectric device as comprising a photo-voltaic cell 159 disposed to look at the interior of the furnace and produce a voltage corresponding to the radiation emanating therefrom. It is evident that equivalent means, such as a thermocouple or thermopile could be employed, or in the event that a variable other than temperature was being measured and/or controlled other devices could be employed. The consideration to be satisfied so far as the embodiment of my invention in Fig. 9 is concerned is that the control windings 156 and 158 should be energized in correspondence with the magnitude of the variable to be recorded and/or controlled.

By construction I make the reactance of the condenser 153 relatively great with respect to the reactance of the output winding 154 and the reactance of the condenser 150 relatively small with respect to the reactance of the output winding 151. The currents in the windings 9 and 10 may be approximated by the following equations:

$$I_{10} = \frac{E_9}{(X_{C153} - X_{L154})}; \quad (X_{C153} > X_{L154}) \quad (1)$$

$$I_9 = \frac{E_{10}}{(X_{L151} - X_{C150})}; \quad (X_{L151} > X_{C150}) \quad (2)$$

where:

$I_9$ = current in pole winding 9
$I_{10}$ = current in pole winding 10
$X_{C153}$ = reactance of condenser 153
$X_{C150}$ = reactance of condenser 150
$X_{L154}$ = reactance of output winding 154
$X_{L151}$ = reactance of output winding 151
$E_9$ = voltage across winding 9
$E_{10}$ = voltage across winding 10

It will be observed from Equation 1 that as the reactance of the output winding 154 increases, the reactance of the circuit including the pole winding 10 decreases, thereby effecting an increase in current or energization of the winding. It will further be observed from Equation 2 that as the inductance of output winding 151 increases the reactance of the circuit including the pole winding 10 increases, thereby causing a decrease in the energization of the pole winding. Accordingly, assuming the system to be in equilibrium so that the pole windings 9 and 10 are equally energized, upon a decrease in temperature, causing a proportionate increase in the reactance of output windings 151 and 154, the energization of winding 10 will increase, whereas that of winding 9 will decrease, thereby effecting rotation of motor 7 in predetermined direction. Conversely upon an increase in temperature above the assumed equilibrium point the impedance of output windings 151 and 154 will decrease, thereby decreasing the energization of pole winding 10 and increasing that of pole winding 9 effecting rotation of motor 7 in opposite direction. It will thus be seen that the circuit arrangement shown in Fig. 9 so far described provides for the selective control of the direction of rotation of motor 7 in accordance with changes in temperature within the furnace 1.

So that the amount of rotation of the motor 7 may be proportional to changes in temperature, I cause the motor 7 to adjust the energization of the bias windings 157 and 157A to effect a change in impedance of the output windings 151 and 154 opposite in sense to that caused by a change in temperature within the furnace 1. Assuming an increase in temperature for example, causing an increase in the current in the control windings 156 and 158, as the motor 7 rotates the current in the bias windings 157 and 157A is decreased. When the m. m. f. produced by the windings 156, 157 and 158, 157A is restored to the original value a new position of equilibrium of the motor 7 will be established. The amount of rotation necessary to establish the position of equilibrium will be proportional to the increase in temperature. Conversely upon a decrease in temperature the bias windings 157 and 157A are adjusted so that the m. m. f. produced thereby is increased, thus establishing a position of equilibrium when the motor 7 has rotated an amount proportional to the decrease in temperature. It is therefore evident that the position of the motor 7, and accordingly of the index 2, will at all times correspond to the temperature within the furnace 1.

Figure 10:
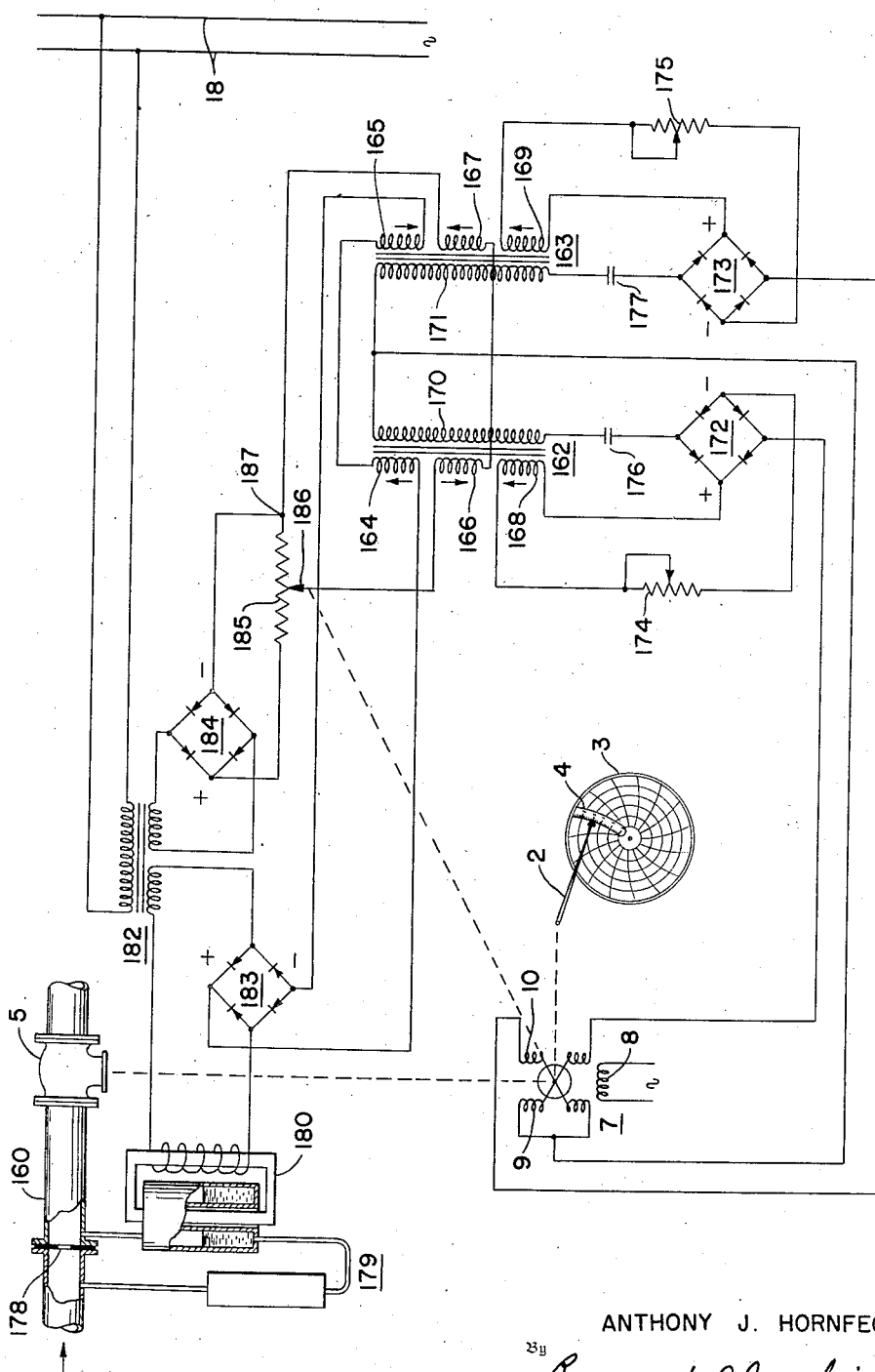

I have described my invention thus far, by way of example, as applied to the measurement and control of temperature. In Fig. 10 I show a further embodiment of my invention arranged to measure and control the flow of fluid through a conduit such as the pipe 160. Normally, that is with a constant flow through the conduit 160, windings 9 and 10 of motor 7 are equally energized. The positioning of the motor 7 is controlled through saturable core reactors 162, 163 so that upon a change in flow, for example a decrease, the energization of one pole winding is increased, whereas that of the other is decreased, and upon an increase in flow the energization of the last named winding is increased, whereas the energization of the first named winding is decreased. Rotation of the motor is thus produced in direction depending upon the sense of the change in rate of flow. When the displacement of the motor is proportional to change in rate of flow, equilibrium is restored, so that both windings 9 and 10 are equally energized.

The reactors 162, 163 are provided with: (1) primary control windings 164, 165 connected in series and the energization of which corresponds to the rate of flow of fluid through the conduit 160; (2) secondary control windings 166, 167 also connected in series and the energization of which corresponds to the position of the index 2, or more particularly to the position of the motor 7; (3) regenerative windings 168, 169 connected to the output windings 170, 171 through bridge rectifiers 172, 173. The energization of the regenerative windings 168, 169 may be adjusted by potentiometers 174, 175 respectively. The output windings 170, 171 are connected in circuit with the pole windings 9 and 10 respectively through condensers 176, 177.

The arrows give the direction of the m. m. f. produced by the various control windings of reactors 162, 163. The net m. m. f. effective for saturating each reactor is equal to the sum of the m. m. f.'s produced by the individual control windings. For the apparatus to be in equilibrium, that is for the impedance of the output windings 170, 171 to be equal and the pole windings 9 and 10 equally energized, it is necessary that the impedance of the winding 170 equal the impedance of the winding 171. Such condition will be established only when the m. m. f. produced by the winding 166 is equal to the m. m. f. produced by the winding 164 and the m. m. f. produced by the winding 167 is equal to the m. m. f. produced by the winding 165.

Assuming a condition of equilibrium to exist, if the current through the windings 164, 165 increases, the saturation of the reactor 162 will increase and that of the reactor 163 will decrease proportionately, this because of the direction of the m. m. f. produced by the control windings. As a result the impedance of the output winding 170 will decrease whereas that of the output winding 171 will increase. Such unequal impedance of the output windings 170, 171 will increase the energization of the pole winding 9 and reduce that of the pole winding 10, causing the motor 7 to rotate in predetermined direction. Conversely if the current through the windings 164, 165 decreases the impedance of the output winding 170 will increase, whereas that of the output winding 171 will decrease. The energization of the winding 10 will then increase, and that of the winding 9 decrease, effecting rotation of the motor 7 in opposite direction.

As the motor 7 rotates in one direction or the other, the energization of control windings 166, 167 is varied proportionately and when the m. m. f. produced by these windings is again equal to that produced by the windings 164, 165 the condition of equilibrium will be reestablished. The circuit disclosed will therefore effect operation of the motor 7 in amount and in direction depending upon the amount of change in energization of the control windings 164, 165 and the sense of that change.

As shown in Fig. 10 the energization of the control windings 164, 165 is varied in accordance with the rate of flow of fluid through the conduit 160. To so control or vary the energization, I show a flow responsive device comprising a restriction 178 in the pipe 160, which as known will produce a pressure differential corresponding to the rate of flow. The differential produced by the restriction 178 is measured by means of a U-tube 179 in which is a suitable sealing liquid such as mercury, the height of which in either leg of the U-tube will be proportional to the rate of flow through the conduit 160. I so arrange one leg of the U-tube that the mercury therein forms a secondary for a transformer 180, the primary of which is energized from the A. C. source 18 through a transformer 182. As the mercury rises in the leg in proportion to increases in the rate of flow through the pipe 160 the impedance of the transformer will be proportionately decreased, causing a greater flow of current through the primary.

By means of a bridge rectifier 183 I rectify the alternating current to direct current and utilize the direct current to energize the windings 164, 165. It will be seen therefore that the energization of the windings 164, 165 will correspond to the rate of fluid flow through the pipe 160.

In order that the current in the windings 166, 167 may vary in correspondence with the position of the motor 7, and hence in correspondence with the position of the index 2, I provide a potentiometer which conveniently may be provided with direct current through a bridge rectifier 184 from the alternating current source 18. The direct current output of the bridge rectifier is impressed across a slide wire resistance 185. Engaging the slide wire resistance is a contact 186 positioned by the motor 7. The winding 166 is connected to the contact 186 and the winding 167 is connected to one end of the slide wire resistance at point 187. The current in the windings 166, 167 will accordingly be proportional to the position of the contact 186 along the slide wire resistance 185. As the motor 7 rotates in one direction or the other the current in the windings 166, 167 will be varied proportionately.

By providing the resistance 185 with direct current through the bridge rectifier 184, the alternating current side of which is supplied from the source 182, eliminate any errors which might otherwise be caused by variations in voltage of the source. It will be noted that any variations in the voltage of the source 18 will affect the energization of windings 164, 165 and 166, 167 equally. Hence if the m. m. f. established by these windings are equal before a change in the potential of the source 18 they will likewise be equal after a change in potential of the source.

As well as exhibiting the flow of fluid through the pipe 160 by means of the index 2, cooperating chart 3 and scale 4, the flow may be controlled by means of the valve 5, which as explained heretofore may be positioned by the motor 7 through suitable reducing gears or other mechanical means.

Figure 11:
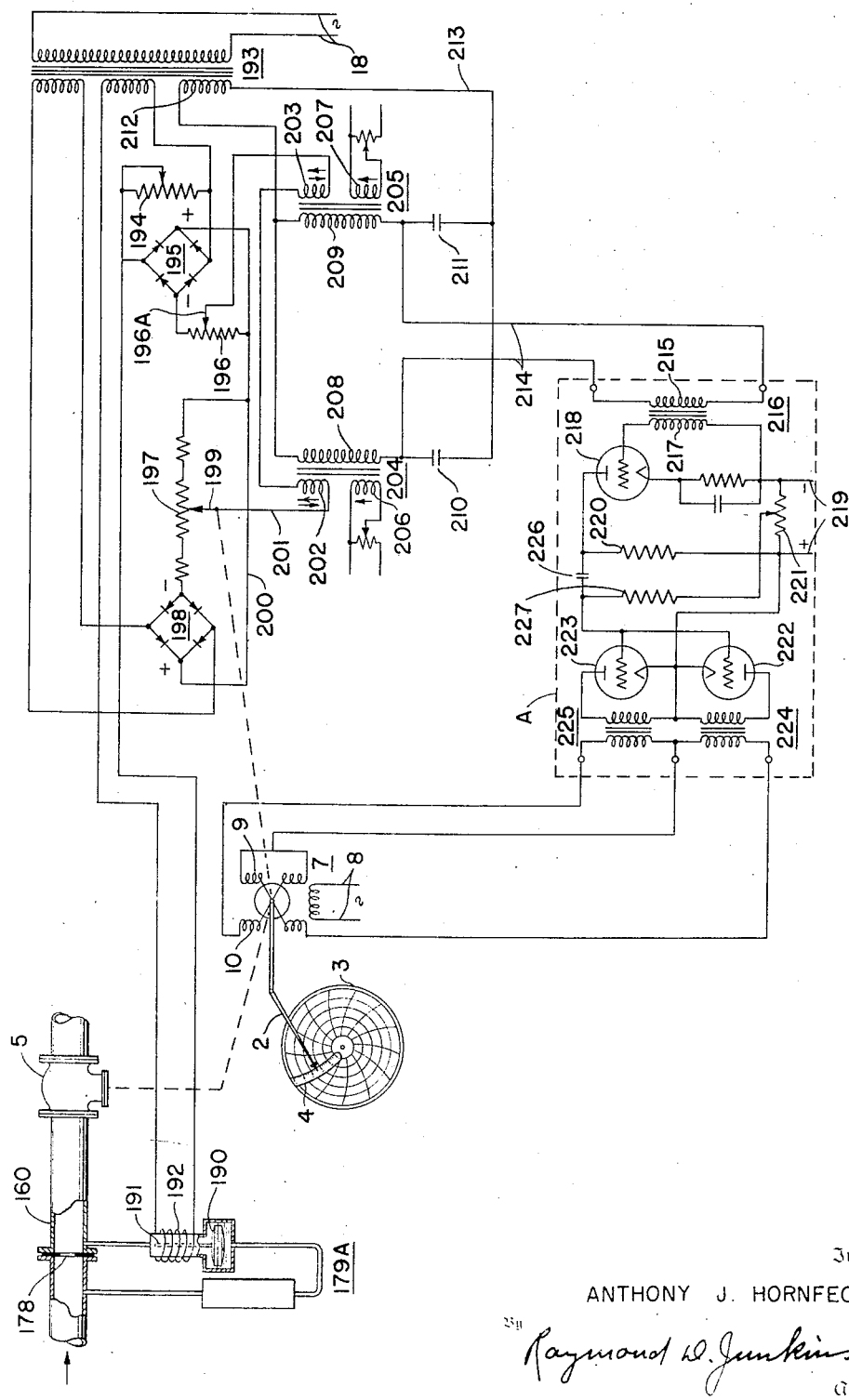

In Fig. 11 I show a further modified form of my invention arranged to measure and control the flow of fluid through the pipe 160. In the embodiment shown in Fig. 11 I produce a direct current having a direction depending upon the sense of change in the rate of fluid flow, and by means of saturable core reactors suitably disclosed in a bridge cause this direct current to produce corresponding changes in an alternating voltage having a phase depending upon the direction of the direct current. This alternating voltage I then, by means of a suitable amplifier, cause to operate a reversing motor to exhibit and to control the rate of fluid flow.

Referring to Fig. 11, I therein show a U-tube 179A connected across the restriction 178, and in one leg of which is disposed a float 190 adapted to be vertically positioned by a suitable sealing liquid, such as mercury, in accordance with the rate of fluid flow through the pipe 160. The float carries a magnetic core piece 191, which is positioned relative to a stationary inductance coil 192 by movements of the float 190. The impedance of the coil 192 will be a function of the position of the core piece 191, and hence of the rate of flow of fluid through the conduit 160.

The coil 192 is energized from the source 18 through a suitable transformer 193 and connected in circuit therewith is an adjustable resistance 194. The current in the circuit which includes the coil 192 and resistance 194 will vary with the rate of flow through the conduit 160, and hence the potential drop across the resistance 194 will be a function of that fluid flow. By means of a bridge rectifier 195 I produce a direct current potential drop in an adjustable resistance 196 proportional to the alternating current potential drop in the resistance 194. The magnitude of the direct current potential may be varied by means of an adjustable contact 196A engaging the resistance 196.

The potential drop in the resistance 196 is in effect compared to one which is a measure of the position of the motor 7 and the latter varied by the motor 7 to maintain the two potential drops equal, whereby the position of the motor 7 and hence of the index 2 and valve 5 is at all times proportional to the rate of fluid flow through the conduit 160. To obtain a direct current potential varying as the position of the motor 7 I provide a slide wire resistance 197 energized by the source 18 through transformer 193 and a bridge rectifier 198. Engaging the resistance 197 is a contact 199 positioned by the motor 7. One end of the resistances 196 and 197 are maintained at the same potential by a common connector 200, so that the potential at the contact 199 relative to that at the contact 196A depends upon the position of the motor 7 relative to the fluid flow through the conduit 160.

The contacts 196A and 199 are connected by a conductor 201. When the position of the motor 7 corresponds to the rate of flow contacts 196A and 199 will be at equal potential and there will be no current flow through the conductor 201. If now the flow increases, for example, thereby changing the potential of contact 196A, direct current of given direction will pass through the conductor 201. A current of opposite direction will pass through the conductor upon a decrease in flow. Such current flow, through means now to be described, effects operation of the motor 7 in selected direction so that the contact 199 is moved along the slide wire resistance 197 until the potential thereof is again equal to that at the contact 196A.

Connected in the conductor 201 are control windings 202, 203 of saturable core reactors 204, 205, which are also provided with adjustable direct current bias windings 206, 207 and alternating current output windings 208, 209 respectively. The m. m. f. produced by the bias windings, as indicated by the arrows, is in relatively opposite directions. The current in the conjugate conductor 201 of a given direction will therefore decrease the impedance of one output winding and increase that of the other. A current of opposite direction in the conductor 201 will produce the opposite effect, the impedance of the former output winding then increasing and that of the latter decreasing. The output windings 208, 209 are each included in a separate arm of an alternating current bridge, in the other arms of which are condensers 210, 211. In one conjugate conductor 213 is a secondary winding 212 of the transformer 193, which provides a source of alternating current to the bridge. The other conjugate conductor 214 includes a primary winding 215 of a transformer 216.

Assuming the bridge to be in balance, no current will pass through the conjugate conductor 214. If now there is a change in the rate of fluid flow the impedance of one or the other of the output windings 208, 209 will be increased, whereas that of the other will be decreased, thereby unbalancing the bridge and producing a current flow in the conjugate conductor 214. The phase of the current in the conjugate conductor 214 with respect to that of the source 18 will depend upon the sense of the change in rate of fluid flow through the conduit 160. The particular pole winding of the motor 7 effectively short circuited depends upon the phase of the current in the conjugate conductor 214.

So that such relatively minute currents as may be produced in the conjugate conductor 214 may be used to control the selective short circuiting of the windings 9 and 10 I employ an electrical amplifying means A, certain specific features of which form the subject matter of Patent 2,275,317, dated March 3, 1942, to John D. Ryder. In respect to Fig. 11 I have shown and will describe the amplifying means A in some detail, whereas with reference to the embodiment of my invention shown in Fig. 12 I will illustrate the amplifying means schematically and will refer to it as "amplifier A."

The transformer 216 has a secondary 217 the opposite terminals of which are connected to the cathode and grid of an electron discharge device 218. The output circuit of the device 218 is shown as including a source of direct current 219 and a resistance 220. If desired, the grid of the device 218 may be biased by means of a voltage divider 221 connected across the source 219 so that the device 218 is non-conducting or conducting a predetermined amount. When no current passes through the conjugate conductor 214 a direct current having no pulsating component may or may not flow through the output circuit of the device 218 depending upon the bias of its grid. Assuming now that alternating current is passing through the conjugate conductor 214, the current in the output circuit of the device 218 will become pulsating in character. The amplitude of the pulsations will depend upon the amount of current in the conjugate conductor 214, and the phase of the pulsations with respect to the pulsations of the source 18 will depend upon the phase of the current in the conjugate conductor 214.

The pulsating current passing through the output circuit of the device 218 is utilized to control the current transmission through a second pair of electron discharge devices 222 and 223, the output circuits of which are inductively coupled through transformers 224 and 225 to the circuits of the pole windings 9 and 10 respectively. Such direct current as may normally flow through the output circuit of the device 218 will have no effect upon the potential impressed upon the grids of the devices 222 and 223 by virtue of a condenser 226. Upon passage of alternating current through the conjugate conductor 214 however the pulsating component of the current induced in the output circuit of the device 218 will pass through the condenser 226 and render either the device 222 or 223 conducting selectively in accordance with the phase of the voltage in the conjugate conductor 214.

The devices 222 and 223 may normally be maintained non-conducting by connecting their grids through a resistance 227 to a suitable point on the voltage divider 221. To provide a high degree of sensitivity in some cases it may be preferable to maintain the devices 222, 223 normally conducting, which may also be accomplished by connecting their grids to a suitable point on the divider 221. In the latter case a pulsating current originating due to current flow in the conjugate conductor 214 will selectively render one or the other of the devices 222 and 223 more conducting, and the other less conducting.

Selective control of the devices 222 and 223 is obtained by arranging them to have opposite polarity. That is when the anode of the device 222 is positive, the anode of the device 223 is negative, and vice versa. The pulsating current in the output circuit of the device 218 caused by a current flow in the conjugate conductor 214 has a polarity depending upon the direction of the direct current in the conductor 201. Thus upon the direct current in the conductor 201 being in one direction, the pulsating current will render the grid of the device 222 more positive with respect to its cathode during the same half cycle that its anode is positive, and hence the device will be rendered conducting. If the current in the conductor 201 is in opposite direction the pulsating current in the output circuit of the device 218 will render the grid of the device 223 more positive with respect to its cathode during the same half cycle that its anode is positive, and hence the device will be rendered conducting. During the half cycle when the anodes of the devices 222 and 223 are negative with respect to their cathodes both devices are of course non-conducting regardless of the potential of their grids.

When either the device 222 or 223 is rendered conducting, thereby short circuiting the secondary of the transformer 224 or 225 respectively, the impedance of the circuits of the pole windings 9 and 10 is sufficiently reduced to effect rotation of the motor 9 in one direction or the other. Such rotation as heretofore described positions the index 2 relative to the chart 3 and scale 4; and simultaneously varies the position of the contact 199 to restore the potential thereof to that of the contact 196A.

Figure 12:
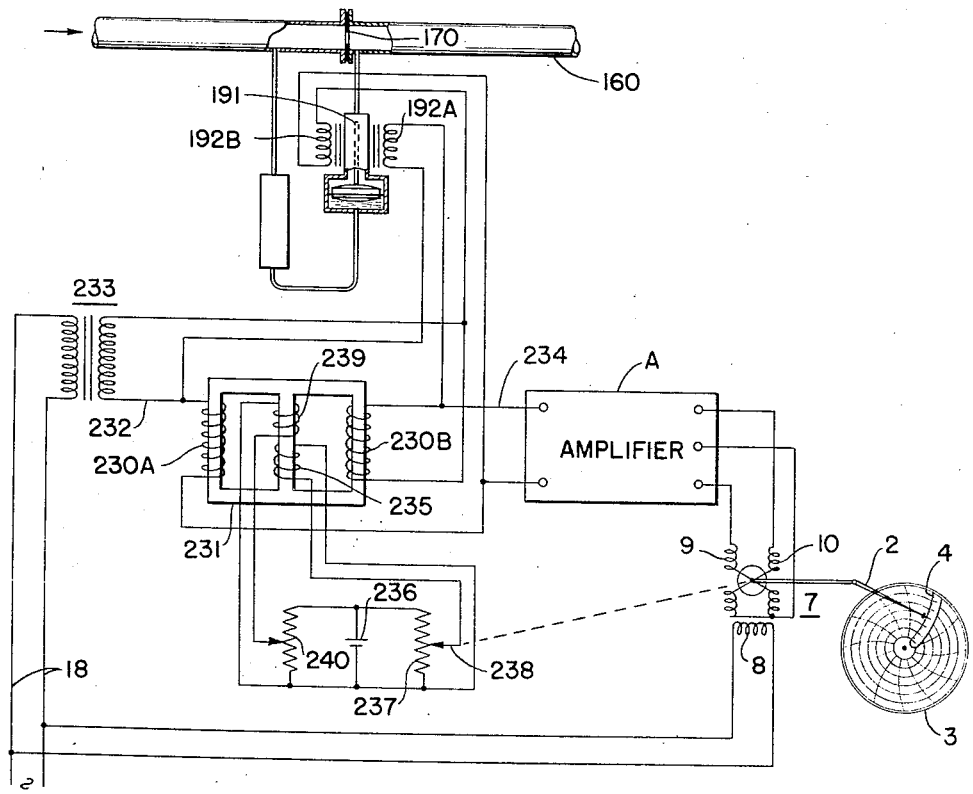

In Fig. 12 I show a further modification of my invention also adapted, as a specific embodiment, to measure the flow of fluid through a conduit such as the pipe 160. In this embodiment I provide a balanceable electric network having four arms. In two opposite arms are impedances such as inductances varied by the variable to be measured, in the specific embodiment to be described, rate of fluid flow. In the remaining two opposite arms are balancing impedances comprising the output windings of a saturable core reactor. Unbalance of the network, as by a variation in the variable being measured, causes a variation in the energization of the control winding of the saturable core reactor, thereby varying the impedance of the output windings and rebalancing the bridge.

In the embodiment shown in Fig. 12 the core piece 191 is positioned relative to two stationary inductance coils 192A and 192B, and hence the impedance of these coils will be simultaneously varied in the same direction in amount depending upon the magnitude of the change in the variable and in sense depending upon the sense of the change in the variable. I have for the sake of clarity and simplicity shown the arrangement of the coils 192A and 192B diagrammatically. Actually as will be readily understood by those familiar with the art these coils would be wound on a single spool piece surrounding the core piece 191.

Figure 12A:
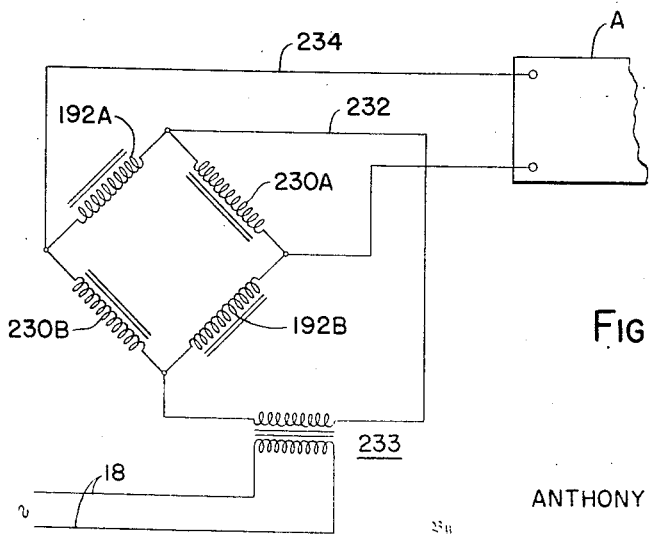
Fig. 12A is a functional diagram of a part of the circuit shown in Fig. 12.

As an aid in understanding my invention I have shown the alternating current parts of the balanceable network illustrated in Fig. 12 in more diagrammatic fashion in Fig. 12A. The coils 192A and 192B are in diametrically opposite arms of an alternating current balanceable electric network, specifically a Wheatstone bridge, in the other two diametrically opposite arms of which are the output windings 230A and 230B of a saturable core reactor 231. One conjugate conductor 232 of the network is connected to the alternating current source 18 through a transformer 233. The other conjugate conductor 234 is connected to the amplifier A.

With the network in balance no current passes through the conjugate conductor 234. A change in rate of fluid flow however, effecting a concurrent change in impedance of the coils 192A and 192B unbalances the bridge, causing a current flow in the conjugate conductor 234. The phase of the current in the conjugate conductor 234 relative to the source 18 will depend upon the sense of the change in rate of fluid flow. The direction of rotation of the motor 7, as explained with reference to Fig. 11, depends upon the phase of the current in the conjugate conductor and hence the motor 7 will rotate in one direction or the other depending upon the sense of the change in rate of fluid flow.

The electrical network is rebalanced by varying the energization of a control winding 235 of the saturable core reactor 231 in accordance with changes in position of the motor 7. The position of the motor 7 will thus at all times correspond to the rate of flow through the conduit 160 which may be recorded and indicated as previously described by means of a suitable index 2 positioned by the motor 7.

The control winding 235 is shown as being energized by a direct current source 236 through a rheostat 237. A contact 238 engaging the rheostat 237 is positioned by the motor 7 and hence the potential effective for energizing the control winding 235 will vary in accordance with the position of the motor 7. To provide a means for calibrating and initially balancing the network, the saturable core reactor 231 may be provided with a secondary control winding 239 energized from the source 236 through a manually adjustable rheostat 240.

I have illustrated the saturable core reactors throughout the drawings in diagrammatic fashion. It will be readily understood by those familiar with the art that they may actually be constructed, as by proper arrangement of the output windings, so that the flux produced by the alternating current output winding will not produce a voltage in the direct current control windings.

The embodiments of my invention illustrated should not be considered as limited to the measurement and/or control of the specific variable shown, for as will be apparent to those familiar with the art the embodiments shown may be used to measure any variable the magnitude of which may be translated into an electrical effect. Thus in Fig. 11 I have shown an embodiment of my invention arranged specifically to measure rate of fluid flow, but the same embodiment could be employed to measure temperature by causing the impedance of the coil 192 to be varied by a temperature responsive device as providing a core piece having a permeability variable with temperature; or by replacing the coil 192 with a temperature sensitive resistance. The scope of my invention should not therefore be considered as being limited to the specific embodiments illustrated, but in order to determine the scope thereof reference should be made to the accompanying claims.

What I claim as new, and desire to secure by Letters Patent of the United States, is:

1. In an electric control system, two saturable core reactors each having an output winding the impedance of which is variable in accordance with the degree of saturation of said reactor, a source of alternating current for energizing said windings, and means responsive to a change in current in the output winding of one of the reactors for varying the saturation of the other reactor to produce a change in current in the output winding of said other reactor in opposite sense to the change in current in the output winding of said one of said reactors.

2. In an electric control system, two saturable core reactors each having an output winding the impedance of which is variable in accordance with the degree of saturation of said reactor, a source of alternating current for energizing said windings, means responsive to a change in current in the output winding of one of the reactors for varying the saturation of the other reactor to produce a change in current in the output winding of said other reactor in opposite sense to the change in current in the output winding of said one of said reactors, and means responsive to the current in the output winding of said other reactor to regeneratively amplify the saturation of said other reactor to produce a further change in the current of the output winding thereof.

3. In an electric control system for a reversing motor, a motor having a rotor and two windings for exerting opposed forces on the rotor, a pair of saturable core reactors each having a primary control winding and each having an output winding which is connected in circuit with one of said motor windings, means normally energizing said control windings equally so that the motor windings exert equal and opposite forces on said rotor, means for selectively varying the energization of said primary control windings to change the current in the output windings and thereby produce rotation of said motor rotor in desired sense, and a secondary control winding on each of said reactors in opposition to the primary control winding and responsive to the current in the output winding of the other reactor so that changes in current in the output winding of one of the reactors causes a corresponding change in current in the output winding of the other reactor but in opposite sense.

4. Apparatus for maintaining a condition at a desired value comprising a saturable core reactor having a primary control winding and an output winding, a source of alternating current for said output winding, reversible means responsive to the current in the output circuit for controlling the magnitude of the condition, means responsive to the magnitude of the condition for energizing said control winding with direct current having a direction dependent upon the sense of departure of said condition from the desired value, a secondary control winding for said reactor, means for energizing said secondary control winding with direct current in accordance with the alternating current in said output circuit so that when the current in the primary control winding is in one direction the saturation of the reactor is regeneratively amplified and the current in the output circuit increased and when the current in the primary control winding is in opposite direction the saturation of the reactor is degeneratively diminished and the current in the output circuit decreased, said reversible control means being selectively operable in one direction or the other depending upon the direction of current in said control winding.

5. Apparatus for controlling the temperature of a heated device, comprising, in combination, a pair of saturable core reactors each having an alternating current output winding and a direct current control winding for saturating the reactor, means responsive to the temperature of the heated device for differentially controlling the current in the primary control windings so that upon an increase in temperature the current in one control winding increases and the current in the other control winding decreases and vice versa, a secondary control winding for each of said reactors for regeneratively amplifying the saturation of each reactor in accordance with the current in the output winding, and means for varying the heating of the heated device dependent upon the difference in magnitudes of the currents in the output windings of said reactors.

6. An electrical measuring and/or control system, comprising a source of alternating current, a reactor member having an output winding connected thereto, a primary control circuit for saturating said reactor, means for controlling the current in said primary control circuit responsive to a variable condition, a secondary control circuit for saturating said reactor directly responsive to the current in the output winding, means for measuring and/or controlling the said condition, said last-mentioned means including a reversible motor having opposed field windings, and means including a saturable core reactor for selectively controlling energization of said motor for operation in predetermined directions in response to variations in the current flowing in said output circuit.

7. Means for adjusting the slide wire in a potentiometer system having a galvanometer, comprising a reversible electric motor having opposed windings, a variable connection to the slide wire operated by the motor, a motor control circuit for energizing the motor for rotation in either direction including a saturable core reactor having a primary control winding and an output winding in circuit with said motor, means for controlling the current in the primary control winding for variably saturating said reactor in accordance with the deflections of said galvanometer, and means for regeneratively amplifying the saturation of the reactor responsive to the current in the output circuit.

8. Apparatus for adjusting the slide wire in a potentiometer system having a galvanometer displaced from a neutral position in correspondence with changes in magnitude of a variable condition comprising, a reversible electric motor having opposed windings, a variable connection to the slide wire operated by the motor, a control circuit for each winding, a pair of saturable core reactors each having an output winding connected in one of said circuits, and each having a primary control winding, means under control of the galvanometer for differentially energizing said primary control windings in accordance with the sense of displacement of the galvanometer from the neutral position, a secondary control winding for each reactor, means for energizing said secondary winding in accordance with the current in the output winding of the reactor and in a sense to regeneratively amplify the change in current in the output winding of the reactor caused by a change in current in the primary control winding, a tertiary control winding for each reactor, and means for energizing said tertiary winding in accordance with the current in the output winding of the other reactor and in a sense to vary the current in the output winding in opposite sense to a change in the current in the output winding of said other reactor.

9. In an electric control system, two saturable core reactors each having an output winding the impedance of which is variable in accordance with the degree of saturation of said reactor, a source of alternating current for energizing said windings, a primary control winding for each of the reactors, means for varying the current in each of said primary windings to produce primary variations in the saturatiton of the reactors, a secondary control winding for each reactor energized in accordance with the current in the output winding for regeneratively amplifying the saturation of the reactor in response to a change in the current in the output winding, and a tertiary control winding for each reactor for producing changes in the saturation of the reactor in opposite sense to changes in the current in the output circuit of the other reactor.

10. Apparatus for maintaining a variable at a desired value comprising a saturable core reactor having an alternating current output winding the impedance of which is variable in accordance with the degree of saturation of said reactor, primary means for producing an effective m. m. f. of one polarity for saturating said reactor when said variable is below the desired value and of opposite polarity when said variable is above the desired value, means to increase the saturation of said reactor when said effective m. m. f. is of one polarity and to decrease the saturation of said reactor when the m. m. f. is of opposite polarity comprising secondary means for producing a unidirectional m. m. f. for saturating said reactor in accordance with the current in the output winding, and control means of the variable under the control of the current in the output winding of said reactor, and selectively operable in one direction or the other in response to the change of polarity of the m. m. f. produced by said primary means.

11. Apparatus for maintaining a dependent variable in correspondence with an independent variable comprising a potentiometer system for producing a direct current having a polarity depending upon which of said variables is the greater, means including a pair of saturable core reactors and a source of alternating current for converting said direct current into an alternating current voltage having a phase depending upon the polarity of said direct current, a motor having opposed windings for varying the magnitude of said dependent variable to maintain it in correspondence with the independent variable, and means for selectively energizing one or the other of said windings in accordance with the phase of said alternating voltage.

12. Apparatus for measuring the rate of flow of a fluid comprising a pair of saturable core reactors each having an alternating current output winding and a primary direct current control winding, means for energizing said primary control windings in accordance with the rate of fluid flow, a motor having opposed windings connected in circuit with the output windings of said reactors, exhibiting means positioned by said motor, a secondary direct current control winding for each of said reactors, means for energizing said secondary control windings in accordance with the position of said exhibiting means, a tertiary direct current control winding for each of said reactors, means for energizing each of said tertiary control windings in accordance with the impedance of the output winding of the associated reactor; said control windings so arranged that when the position of said exhibiting means corresponds to the rate of fluid flow the windings of said motor are equally energized and upon change in the rate of fluid flow the windings are differentially energized so that said motor positions said exhibiting means in one direction or the other until correspondence is restored.

13. Apparatus comprising a saturable core reactor having a direct current energizing winding and two alternating current output windings, an alternating current bridge having four arms, one of said output windings connected in one of the arms of said bridge and the other of said windings connected in a diametrically opposite arm, an inductance in each of the other diametrically opposite arms of the bridge, means for simultaneously varying the impedance of said last named inductances to unbalance said bridge; and means responsive to unbalance of said bridge for varying the energization of the control winding of said saturable core reactor to thereby simultaneously vary the impedance of said output windings and rebalance said bridge.

14. Apparatus comprising an alternating current bridge having four arms, a variable inductance connected in each of the arms of said bridge, means for simultaneously varying the impedance of two of said inductances in diametrically opposite arms of said bridge to thereby unbalance said bridge; and means responsive to unbalance of said bridge for simultaneously varying the impedance of the other two diametrically opposite arms of the bridge to rebalance said bridge comprising, a magnetic core for said last named inductances, a direct current control winding associated with said core for varying the magnetization thereof, and means for varying the energization of said control winding under the control of said means responsive to unbalance of said bridge.

15. An electrical measuring and/or control system, comprising a source of alternating current, a reactor having an output winding connected thereto, a primary control circuit for saturating said reactor, means for controlling the current in said primary control circuit responsive to a variable condition, a rectifier connected in circuit with the output winding for producing a direct current corresponding to the alternating current in the output winding, a secondary control winding for said reactor connected in circuit with said rectifier so that a primary change in the impedance of the output winding of said reactor caused by a change in current in said primary control winding is followed by a further change caused by a change in current in said secondary control winding; and means for measuring and/or controlling the said condition, said last-mentioned means including a reversible electric motor having opposed field windings, means including a pair of saturable core reactors respectively connected in circuit with each field winding, each of the reactor members of said pair including a winding energized by the current flowing in said output circuit whereby to control selectively energization of said motor for rotation in predetermined directions in response to variations in the current flowing in said output circuit.

16. In an electric control system for a reversing motor, a motor having a rotor and two windings for exerting opposed forces on the rotor, a pair of saturable core reactors each having a primary control winding, an output winding on each reactor connected in circuit with the respective motor windings, means normally energizing said control windings equally so that the motor windings exert equal and opposite forces on said rotor, means for selectively varying the energization of said primary control windings to change the current in the output windings and thereby produce rotation of said motor rotor in desired sense, and a secondary control winding on each of the reactors, each said secondary control winding being respectively connected in circuit with the output winding of the other reactor and in opposition to the respective primary control windings so that changes in the current in the output winding of one of the reactors causes a corresponding change in the current in the output winding of the other reactor but in opposite sense.

17. In an electric control system for a reversing motor, a motor having a rotor and two windings for exerting opposed forces on the rotor, a pair of saturable core reactors each having a primary control winding, an output winding on each reactor connected in circuit with the respective motor windings, means normally energizing said control windings equally so that the motor windings exert equal and opposite forces on said rotor, means for selectively varying the energization of said primary control windings to change the current in the output windings and thereby produce rotation of said motor rotor in desired sense, a secondary control winding on each of the reactors, each said secondary control winding being respectively connected in circuit with the output winding of the other reactor and in opposition to the respective primary control windings so that changes in the current in the output winding of one of the reactors causes a corresponding change in the current in the output winding of the other reactor but in opposite sense, and a tertiary control winding on each reactor connected respectively in series circuit arrangement with the respective secondary control winding of the other reactor, the m. m. f.'s of the secondary and tertiary control windings of each reactor being arranged in opposition with respect to each other whereby to further regeneratively amplify the change in the m. m. f.'s in the said one reactor and to further degeneratively diminish the m. m. f.'s in the said other reactor.

18. An electrical measuring and/or control system, comprising a source of alternating current, a reactor having an output winding connected thereto, a primary control circuit for saturating said reactor, means for controlling the current in said primary control circuit responsive to a variable condition, a secondary control winding for said reactor energized in accordance with the current in said output winding for regeneratively amplifying the saturation of said reactor to produce a further change in the impedance of said output winding in the same direction as and following a primary change caused by a change in current in said primary control winding, and means for measuring and/or controlling the said condition, said last-mentioned means including a reversible electric motor having opposed field windings, a pair of saturable core reactors respectively connected in circuit with said windings, each of said last-mentioned reactor members including a saturating winding arranged to induce m. m. f. in the respective reactor members of opposite polarity, said reactor members also each including a control winding in circuit with said output winding and arranged to generate m. m. f.'s of the same polarity whereby to selectively control energization of said motor for rotation in predetermined directions in response to variations in the current flowing in said output winding.

19. In combination, an electrical network including an alternating current motor having wire-wound shading poles, selective short circuiting of one of said pole windings effecting rotation of said motor in predetermined direction, a saturable core reactor having a direct current energizing winding and two alternating current output windings, an alternating current bridge having four arms, one of said output windings connected in one of the arms of said bridge and the other of said windings connected in a diametrically opposite arm, an inductance in each of the other diametrically opposite arms of the bridge, means for simultaneously varying the impedance of said last-named inductances to unbalance said bridge, means responsive to unbalance of said bridge controlling the effective short-circuiting of said pole windings selectively dependent upon direction of unbalance, and means positioned by said motor for varying the energization of the control winding of said saturable core reactor to thereby simultaneously vary the impedance of said output windings and rebalance said bridge.

20. In combination, an electrical network including an alternating current motor having wire-wound shading poles, selective short-circuiting of one of said pole windings effecting rotation of said motor in predetermined direction, an alternating current bridge having four arms, a variable inductance connected in each of the arms of said bridge, means for simultaneously varying the impedance of two of said inductances in diametrically opposite arms of said bridge to thereby unbalance the bridge; means responsive to unbalance of said bridge for simultaneously varying the impedance of the other two diametrically opposite arms of the bridge to rebalance said bridge comprising, a magnetic core for said last-named inductances, a direct current control winding associated with said core for varying the magnetization thereof, means responsive to unbalance of said bridge controlling the effective short-circuiting of said pole windings selectively dependent upon direction of unbalance, and means positioned by said motor varying the energization of said control winding to rebalance said bridge and under the control of said means responsive to unbalance of the bridge.

ANTHONY J. HORNFECK.